(12) United States Patent
Helvey et al.

(10) Patent No.: US 10,237,137 B2
(45) Date of Patent: Mar. 19, 2019

(54) REMOTELY ASSIGNED, BANDWIDTH-LIMITING INTERNET ACCESS APPARATUS AND METHOD

(71) Applicants: Edward Linn Helvey, Morgan Hill, CA (US); David Andrew Hulse, Athens (GR); Todd James Palmer, Salt Lake City, UT (US); John Joseph Brannelly, Draper, UT (US)

(72) Inventors: Edward Linn Helvey, Morgan Hill, CA (US); David Andrew Hulse, Athens (GR); Todd James Palmer, Salt Lake City, UT (US); John Joseph Brannelly, Draper, UT (US)

( * ) Notice: Subject to any disclaimer, the term of this patent is extended or adjusted under 35 U.S.C. 154(b) by 0 days.

(21) Appl. No.: 15/702,582

(22) Filed: Sep. 12, 2017

(65) Prior Publication Data
US 2018/0077025 A1 Mar. 15, 2018

Related U.S. Application Data

(60) Provisional application No. 62/393,579, filed on Sep. 12, 2016, provisional application No. 62/428,609, filed on Dec. 1, 2016.

(51) Int. Cl.
*H04W 4/30* (2018.01)
*H04W 4/50* (2018.01)
(Continued)

(52) U.S. Cl.
CPC ...... *H04L 41/0896* (2013.01); *H04L 12/1403* (2013.01); *H04L 12/1432* (2013.01);
(Continued)

(58) Field of Classification Search
CPC ..... G06Q 50/12; G01L 13/00; G01L 15/1815; G01L 15/1822; G01L 15/22; G01L 15/26;
(Continued)

(56) References Cited

U.S. PATENT DOCUMENTS 5,661,517 A    8/1997    Budow et al.
6,119,088 A    9/2000    Ciluffo
(Continued)

FOREIGN PATENT DOCUMENTS

EP    0999674    5/2000
EP    1246439    10/2002
(Continued)

OTHER PUBLICATIONS

A ZigBee-Based Home Control System Using OSGI Management Platform, Ming-Chiao Chen and Cheng-En Wu, International Journal of Smart Home, vol. 6, No. 4, Oct. 2012, pp. 15-28.
(Continued)

*Primary Examiner* — Timothy J Weidner
(74) *Attorney, Agent, or Firm* — Pate Baird, PLLC

(57) ABSTRACT

A network (e.g., LAN/WLAN) contains individual private networks, each with an access point assistant (APA) containing an access point, web server, and other components, such as support voice interaction therewith. APAs are separated by device isolation over the LAN, but devices on each individual private network are accessible to each other directly, including cell phones, laptop computers, tablets, iPods, or other network aware devices literally owned or controlled by a guest assigned the APA at a hospitality property. The access management system assigns to an APA a bandwidth limit, which it then administers and accounts for, avoiding the classic problem of "bandwidth hogs" swamping the LAN with no accountability or control.

20 Claims, 21 Drawing Sheets

(51) Int. Cl.
| | |
|---|---|
| *G06Q 50/12* | (2012.01) |
| *G10L 13/00* | (2006.01) |
| *G10L 15/18* | (2013.01) |
| *G10L 15/22* | (2006.01) |
| *G10L 15/26* | (2006.01) |
| *H04L 12/14* | (2006.01) |
| *H04L 12/24* | (2006.01) |
| *H04L 12/26* | (2006.01) |
| *H04L 12/28* | (2006.01) |
| *H04L 12/46* | (2006.01) |
| *H04L 29/06* | (2006.01) |
| *H04L 29/08* | (2006.01) |
| *H04W 12/02* | (2009.01) |
| *H04W 12/08* | (2009.01) |
| *H04W 84/12* | (2009.01) |
| *H04W 88/08* | (2009.01) |

(52) U.S. Cl.
CPC .......... *H04L 12/2834* (2013.01); *H04L 12/46* (2013.01); *H04L 41/046* (2013.01); *H04L 41/18* (2013.01); *H04L 41/28* (2013.01); *H04L 43/0894* (2013.01); *H04L 63/20* (2013.01); *H04L 67/125* (2013.01); *H04L 69/26* (2013.01); *H04W 4/30* (2018.02); *H04W 4/50* (2018.02); *H04W 12/02* (2013.01); *H04W 12/08* (2013.01); *G06Q 50/12* (2013.01); *G10L 13/00* (2013.01); *G10L 15/1815* (2013.01); *G10L 15/1822* (2013.01); *G10L 15/22* (2013.01); *G10L 15/26* (2013.01); *G10L 2015/223* (2013.01); *H04L 67/02* (2013.01); *H04W 84/12* (2013.01); *H04W 88/08* (2013.01)

(58) Field of Classification Search
CPC .......... G01L 2015/223; H04L 12/14–12/1407; H04L 12/1432–12/1442; H04L 12/22; H04L 12/283–12/2836; H04L 12/46; H04L 41/04–41/048; H04L 41/0876–41/0896; H04L 41/18; H04L 41/28; H04L 43/0876–43/0894; H04L 63/20; H04L 67/02–67/025; H04L 67/12–67/125; H04L 69/26; H04W 4/04–4/043; H04W 4/30–4/38; H04W 4/50; H04W 12/02; H04W 12/08; H04W 84/12; H04W 88/08
See application file for complete search history.

(56) References Cited

U.S. PATENT DOCUMENTS

| | | | |
|---|---|---|---|
| 6,130,892 | A | 10/2000 | Short et al. |
| 6,636,894 | B1 | 10/2003 | Short et al. |
| 6,789,110 | B1 | 9/2004 | Short et al. |
| 6,868,399 | B1 | 3/2005 | Short et al. |
| 6,903,755 | B1 | 6/2005 | Pugaczewski et al. |
| 7,088,727 | B1 | 8/2006 | Short et al. |
| 7,194,554 | B1 | 3/2007 | Short et al. |
| 7,554,995 | B2 | 6/2009 | Short et al. |
| 8,266,266 | B2 | 9/2012 | Short et al. |
| 8,903,978 | B2 | 12/2014 | Zerr et al. |
| 9,330,388 | B2 | 5/2016 | Pitroda et al. |
| 10,044,724 | B2 * | 8/2018 | Warrick ................ H04L 61/103 726/4 |
| 2003/0149576 | A1 | 8/2003 | Sunyich |
| 2004/0013135 | A1 | 1/2004 | Haddad |
| 2004/0059815 | A1 | 3/2004 | Buckingham et al. |
| 2007/0050191 | A1 | 3/2007 | Weider et al. |
| 2007/0226019 | A1 | 9/2007 | Carlson et al. |
| 2009/0180430 | A1 | 7/2009 | Fadell |
| 2014/0159877 | A1 | 6/2014 | Huang |
| 2014/0196025 | A1 | 7/2014 | Corinella |
| 2016/0095017 | A1 | 3/2016 | Ely et al. |

FOREIGN PATENT DOCUMENTS

| | | |
|---|---|---|
| EP | 1267524 | 12/2002 |
| EP | 1956790 | 8/2008 |
| WO | WO9829984 | 7/1998 |
| WO | WO0022792 | 4/2000 |
| WO | WO2005062530 | 7/2005 |
| WO | WO2011123594 | 10/2011 |
| WO | WO2014007837 | 1/2014 |
| WO | WO2015120473 | 8/2015 |

OTHER PUBLICATIONS

How smart are our environments? an updated look at the state of the art, Diane J. Cook[a,*], Sajal K. Das[b], Elsevier, Pervasive and Mobile Computing 3 (2007), www.sciencedirect.com, www.elsevier.com/locate.pmc, Received Dec. 21, 2006, received in revised form Dec. 21, 2006, available online Dec. 28, 2006, pp. 53-73.

The engineering of micro agents in smart environments, Cai Augustus Morals Bolzani and Marcio Lobo Netto International Journal of Knowledge-based and Intelligent Engineering Systems 13 (2009), pp. 31-38.

* cited by examiner

REMOTELY ASSIGNED, BANDWIDTH-LIMITING INTERNET ACCESS APPARATUS AND METHOD

RELATED APPLICATIONS

This application: claims the benefit of U.S. Provisional Patent Application Ser. No. 62/393,579, filed Sep. 12, 2016; and claims the benefit of U.S. Provisional Patent Application Ser. No. 62/428,609, filed Dec. 1, 2016; both of which are hereby incorporated by reference in their entirety.

BACKGROUND

Field of the Invention

This invention relates to computer networks and, more particularly, to novel systems and methods for bandwidth control.

Background Art

Networks are ubiquitous. The Internet has combined numerous local area networks and wide area networks into a world wide web of interconnected routers that transfer and carry messages as data packets across a country and around the world. Networks have several difficulties to deal with. One is bandwidth control, especially for local area networks (LANs), such as may exist for a business, a hospitality property (e.g., hotel, resort, etc.), or the like.

For example, any individual on a network (connected, logged on) may engage (launch, run, operate) programs that try to upload or download an inordinate and inappropriate amount of data. The demand may require a data rate so high that other users are either without access, or have a lower priority. Such a rate is common for streaming video, and interferes with timely communications by others over the network.

Some networks are provided with allocation systems that may provide a protocol by which priority is granted through a network hub to various devices connected to that network as members of the network. However, almost any network can be overloaded such that its throughput capacity is completely consumed or saturated. This causes various users to wait while data is buffered or while information is otherwise delayed in its delivery.

One venue for which such data congestion is common is in the hospitality industry. An individual user may consume an inappropriate amount of bandwidth by streaming videos or other applications as large consumers of data transfer. It would be an advance in the art to provide a method that is more robust for selling, assigning, monitoring, and limiting bandwidth consumption by users of a network at a hospitality property.

Meanwhile, good security practice requires device isolation between devices connected to a network installed at a hospitality property. For example, a user occupying a particular room in a hotel must connect each individual device owned by that user to the network as if it is standing in isolation. None of the benefits of a network at a home or office from whence a guest has arrived are provided. Device isolation prohibits the ability of the multiple individual devices of a single user to "see" one another on the network.

However, without device isolation, a network cannot be secure. Thus, it would be an advance in the art to provide a secure network system that would permit or support a private network between devices owned by a common user occupying a room in a hospitality property, while still providing the security of device isolation against intrusion by others on the privately networked devices.

BRIEF SUMMARY OF THE INVENTION

In view of the foregoing, in accordance with the invention as embodied and broadly described herein, a method and apparatus are disclosed in one embodiment of the present invention as including an access point assistant (APA) or agent operating as a router dedicated to the room and personal user devices within a room. Meanwhile, the APA itself is a node on a computer network, such as a local area network (LAN) or wireless local area network (WLAN) of a property. The various APAs connected to the LAN may be interconnected through a mesh network or the like for optimization of network speed and traffic management. Each APA computer is provided with its own WiFi access point and thus becomes a WiFi hot spot or access point and a hub for the private network of a single user.

The APA system or the agent device may operate as a switch and router for a private network. This is not virtual, but a guest's own actual private network interconnecting or connecting to multiple individual devices owned by a single owner and desired to be able to "see" one another while at the site of the agent. Bandwidth limitations are assigned to the APA devices by a management system 34. Often this will be determined by policy requested by the hotel. APA's each then enforce their own bandwidth limit, assuring that the personal network connected to each agent does not overwhelm the main LAN or WLAN of the property.

Meanwhile, by implementing voice recognition technology, setup and configuration may be automatic. A user may interface with the APA with oral instructions and may receive spoken information from the APA. The APA also includes programming enabling the use of personal data associated with the owner of the personal network. That personal data includes preferences, in order to configure the personal network. It may use them to control hardware appliances or "dumb" devices on the property.

The agent accesses the preferences known from history or from selections by a user previously. The agent may access a property management computer system for the property, and a loyalty database of users. Within the loyalty database, or separate therefrom, may be the user preferences for the user creating a personal network supported by the agent device.

Data may be submitted by any or all devices within the LAN on a property to a publication/subscription broker or service in order to facilitate communication. This communication may be with property management systems associated with a property, property ownership systems corresponding to the property and directed to owners of the property, as well as an APA or agent-management site (e.g., Agent Management System, website, dashboard, etc.) on which the APA is managed.

Voice recognition (speech-to-text, STT) systems, converting speech to text, as well as natural language understanding (NLU) systems, for converting the text to actual commands, are available to the APA device. Likewise, text may be converted to speech through a text-to-speech (TTS) engine programmed to do so. The APA can access third party information services over the Internet in order to respond to questions. It retrieves information from them on behalf of the user and presents it accordingly either using the touchscreen, perhaps orally, or the like. Other vendors of services or products may also be contacted at their websites, URLs, or the like through a browser on the APA.

The APA may control devices including the environment of a room entered by a user on a property, appliances in that room, entertainment systems available in that room, and other devices. These may be wired, wireless, processor-based, non-processing, networked, or directly controlled.

In certain embodiments, many or most of the devices, software programmed thereon, and services provided thereby may be hosted in the cloud, on a computer at a distant location over the Internet away from the property. The LAN/WLAN network interconnects all of the APAs on the property.

Some of the benefits of the system provide assignment and control of bandwidth. It may provide automatic configuration of multiple APAs at the property. It may provide automatic configuration of a personal network by an APA to create the personal network of a user. This may be done in accordance with the configuration of a home environment from which the network or that group of personal devices in that personal network originated.

A device such as a smart phone, laptop computer, or other personal computerized device may connect to a publicly available network, such as a hotel hotspot, a café WiFi connection, tablet, or the like. Upon activation, of the device, if WiFi is selected to be active, then the operating system begins to search for available networks. Upon detecting various networks, and typically with their security condition (password required, unsecured, etc.), a user may select a particular network. The user selection of one of the available networks listed is referred to as "associating with" that network.

OSI/ISO layers exist, and a physical connection would indicate to the personal device that it is capable of sending packets. However, as a practical matter, a gateway or router stands between the WiFi hotspot to which the personal device is connecting, and the remainder of the Internet. Accordingly, no communication in either direction is necessarily effected. In a private network, such as a home Internet connection, no practical reason exists to refuse to forward a packet to the Internet. In contrast, in a public environment, or a "public WiFi" in a hotel or other guest environment, that access must be controlled, paid for, permitted, or all of the above. For example, a hotel may actually charge guests for a connection to the Internet, or a higher speed, or an otherwise enhanced connection.

Nevertheless, in order to connect at all, by providing a password, security information, agreement to terms of service, or a payment, an individual user needs some initial communication in order to effect that connection. Otherwise, packets sent from the personal device will be returned, or dead ended, or otherwise fail to be effective. Until access is approved, the gateway, router, or the like will simply drop the packets. What is needed is a mechanism to inform the user of the next steps required of the user in order to obtain access. As a practical matter, a network can only forward a packet to a known route toward a destination or refuse to forward them.

In one conventional approach, an attempt by a personal device to access a webpage, such as by sending a packet requesting services from a webpage, a browser runs an application level protocol to retrieve the webpage. That packet is then intercepted at a network layer by the gateway or router, resulting in return of a redirection at the application level. That destination to which the user device is redirected is typically a "captive portal page." That page, accordingly informs the user that a payment or other action is required in order to gain access.

One issue here is that the application might not be interactive like a web browser whose sole purpose is to solicit interaction from the user toward a particular web site. Instead the application might be a game running an application protocol to control the game, but which is not meant to be interactive with the user. Thus, when those protocol interactions fail, the application believes the Internet isn't working, and the game will report some kind of error and likely refuse to operate.

The user has to KNOW to connect their web browser in order to get the captive portal and negotiate access. How do they know if they have never done it before? To solve this problem, some device manufacturers have added Captive Portal Assistants, which detect whether Internet access is being impeded by a Captive Portal or not. If so, they pop up and provide access to the captive portal in a pop-up mini web browser. This allows users to get online without having to really know what is going on, but is a glorious kludge.

One of the difficulties of such a mechanism is that the application requiring access to the Internet is not warned, notified, or otherwise enabled to make the connection by redirection or other mechanism. The application may not be interactive like a web browser whose sole purpose is to solicit interaction from the user toward the particular web site. Instead, the application may be a game running an application protocol to control the game, but which is not meant to be interactive with the user. Thus, when those protocol interactions fail, the application believes the Internet is not available, and the game will report an error and likely refuse to operate. At this point, the user has to know to use their web browser to access the captive portal and negotiate access.

Attempting to connect to a secure website through a browser on a personal device (typically through the HTTPS protocol), this mechanism is typically configured to detect and reject circumvention. For example, in modern computer hacking, intercepting and redirecting packets by unauthorized persons and devices must be avoided, rejected, or otherwise protected against. Accordingly, the HTTPS protocol has within it a functional mechanism to assure that connections are not hijacked by malware. That would be referred to as a "man-in-the-middle attack." Otherwise, this other "man-in-the-middle" may report back to the personal device that it represents the desired destination, and thereby redirect packets to an improper site.

As a practical matter, captive portals are effectively operating as man-in-the-middle attacks. Even when these portals are owned by a private guest-related entity, such as a hotel, restaurant, or the like providing WiFi or other Internet access, they operate on the improper principle of a man-in-the-middle attack. Now the rub is that HTTPS has built into it certain mechanisms to prevent operation of these man-in-the-middle attacks, even when desired and non-nefarious.

With the increased awareness and activity surrounding Internet security, the HTTPS protocol has become much more prevalent. Thus, prior art systems built on man-in-the-middle attack mechanisms cannot operate in an HTTPS environment. This results first in a user attempting to connect to a secure website, second failing, and third, typically, receiving a notification that some security protocol has been violated and access is denied. All users have probably received a warning that a site is insecure and inviting them to make a decision as to whether they want to abandon the attempt at connection or continue in spite of the security violation. In order to effect service, one must dispense with the security violation or rather accept it and dispense with its warning.

Accordingly, the loss of security by affirmative choice or selection by a user has thus dispensed with the very security that is so necessary. In other words, the user actually does not know what device or system their personal device (e.g., iPhone, smartphone, tablet, laptop, or the like) is actually connected to. Most users simply become familiar with certain trusted sites. However, other users may be and are regularly diverted to improper sites. This is a major attack vector for the introduction of viruses and worms and other malware. People may circumvent security mechanisms designed to protect them. If hackers want an easy way to get into systems, insecure hotel networks are a perfect choice.

Another very insidious result is the acceptance or acquiescence of users routinely to security violations. In other words, users realize that connecting to the Internet requires them to select insecure sites, and thereby the entire Internet of security systems developed are simply obviated by choice, the choice being required by necessity and frustration.

The purpose of a captive portal is a means for a user to negotiate access. This will typically be done by providing a password, paying a fee, agreeing to terms of service, or otherwise meeting a compliance requirement imposed by the captive portal. The captive portal must make itself visible on the browser or in the browser window of the user's personal device. One principal problem with that configuration or mechanism is that security has already been breached in order to make the user aware of the compliance requirement.

The root of the issue is that negotiating network access is an action the user must take, but the network has no secure and proper means to provide the user interface required to do that, nor inform the user that an action is required. The basic premise is that, by denying access to service, the user will at some point wonder what is going on, and hopefully stumble upon the captive portal with all the security violations that entails along the way. In an ideal world, the network would be able to "push" the captive portal user interface to the user's device to both notify them and force them to negotiate access. However, this is simply not technically possible for a number of reasons.

In contrast, an apparatus and method in accordance with the invention establishes the access point assistant (APA) device as a router. However, this router is itself a node or device on another network that is secure. For example, in a prior art system, a user device must "communicate" with a router that is onsite at the service provider (e.g., the server in the basement of the hotel where the user is a guest), it has no other mechanism to access it.

Comparing a system and method in accordance with the invention to prior art systems, the APA in the invention becomes the router blocking packets from access to the Internet. In prior art systems, the user, through the user's personal device, is prohibited from communicating directly with the gateway providing public access to the Internet. Neither the individual nor the individual device is capable of instructing that gateway to connect to the user's device, nor is that gateway even capable of communicating with the user's device.

Literally the human being needing access often has no keyboard or other interface control to instruct the gateway to provide access. The captive portal, and its pages presented on the browser of the user's device is the mechanism by which the user gets access to that gateway. Providing compliance information provides that access. That is the mechanism by which the user delivers an instruction to the router or gateway to provide access. Meanwhile, it is a mechanism whereby the router or gateway also vets the user by payment of a fee, other compliance activities, or the like.

By moving the router, or the device or agent that actually does the router function for the guest, right into the bedroom (guest room) of that guest, an interface is now possible directly from the person to the router. In fact, it is not even required that the person interact with the router through the personal electronic device (e.g., phone, laptop, tablet, other computer device, or the like).

This means that the human being may now actually interact essentially directly with the router to control that router independent of the computerized device. This completely changes, radically, the topology of the network and of the interface between the guest and the network. An agent been added that provides the literal (not just virtual) personal, private network in the room, which now is isolated from other rooms and other gateways leading back to the public network.

One of the effects of this topology of having the effective router in the bedroom with a guest is that the guest may have another interface, such as a voice interface with that router. Moreover, the router can now directly inform the user that some action is needed on their part, perhaps by speaking to the user directly, or by displaying something on a screen attached to the router. This has never been possible in prior art systems. This is why we have the Captive Portal Assistant pop-ups and other work-around mechanisms that are no longer needed. Suddenly, access to the router, its configuration, security, and the like can be under the direct control of voice commands from the guest. Seamless simplicity can now be provided to a guest without even having to access personal electronic (computerized) devices in order to interact with the gateway.

Moreover, in an alternative embodiment, it is also possible to provide a voice interface to the conventional router "in the basement of the hotel," so to speak, even without the gateway in the guest bedroom. This presents other complications, but may be done with similar devices. Providing a voice interface, screen interface, other interfaces, or a combination thereof to a user accessing a gateway or router in the basement of a hotel or other accommodation, still would leave unaddressed the problem of security, the control of bandwidth, notwithstanding it could solve the payment for access, payment for bandwidth, and the prior art security breach described hereinabove with respect to captive portal technology.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

FIG. 3 is a schematic block diagram of an APA management system for controlling an APA and managing its functionality, configuration, parameters, and the like;

DETAILED DESCRIPTION OF THE PREFERRED EMBODIMENTS

Figure 1:
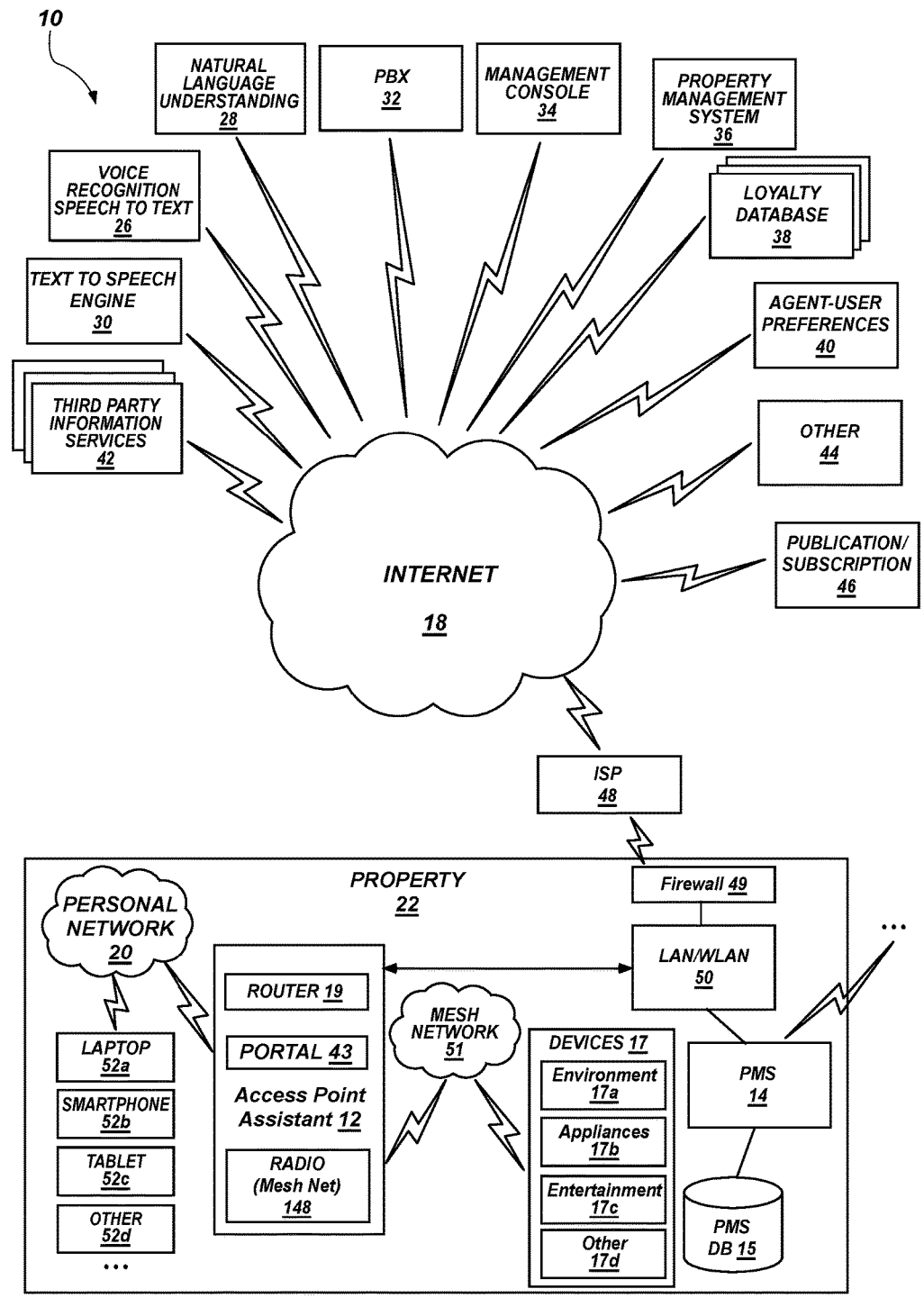
FIG. 1 is schematic block diagram of a system in accordance with the invention, in which individual blocks represent hardware and software for performing the various functions of a private network within a network connected to the Internet.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

Referring to FIG. 1, while also referring generally to FIGS. 1 through 16, a property 22 may include a local area network or wireless local area network (LAN/WLAN) 50 connecting through a firewall 49 to an Internet service provider 48. The Internet service provider 48 provides access to the Internet 18. Meanwhile, the property 22 may have a property management system 14 (PMS 14) onsite with its PMS database 15 (PMS DB 15), or may rely on a property management system 36 offsite located somewhere in the cloud or at a remote location over the Internet 18.

In the illustrated embodiment, the access point assistant (APA) 12 may include a router 19 responsible to mediate network packet traffic between the LAN/WLAN 50 and the personal devices 52 within the personal network 20.

Typically, the devices 17 organic to (existing in, independent of any occupant) the room of a property 22 to which the access point assistant (APA) 12 pertains do not actually need access to the Internet 18. Typically, their mesh net 51 is accommodated entirely by the radio 148 permitting communication between the APA 12 and those devices 17.

The portal 43 exists for the benefit of an engineer or programmer providing support to a particular APA. Each APA has its own on-board portal unique to the device. It can only be used to manage the hosting APA. The portal 43 is available for direct connection to an input device, such as a touchscreen, keyboard, or the like, even including an individual computer that permits programming and control through the portal 43, of the APA 12 at a system level.

The personal network 20 is effectively created by the existence of a WiFi1 147 described hereinbelow. The personal network 20 may include laptops 52*a*, smartphones 52*b*, tablets 52*c*, other devices 52*d*, or the like.

Similarly, the devices 17 organic to the room may include environmental devices 17*a*, appliances 17*b*, entertainment devices 17*c*, or other devices 17*d*. Communication between these devices and the APA 12 is effected through the radio 148.

A system 10 in accordance with certain embodiments of an apparatus and method in accordance with the invention may include several hardware elements programmed with software elements in order to provide the functionality in accordance with the invention. The system 10 may include an APA 12, which may also be called by a name 12 easily recognized as a voice trigger 12 when spoken. In certain embodiments, the APA 12 may be thought of as a hot spot 12 and may include a network router 19. Nevertheless, the APA 12 is more than simply a hot spot 12 or access point 12 for providing network access by a computer 52*a* through 52*d* in accordance with the invention.

Typically, the APA 12 or access point 12 may provide a broadcast signal. Moreover, the APA 12 is also connected to the Internet 18. Nevertheless, the APA 12 may be thought of as a computer programmed to control various inputs and outputs and to receive signals, typically through voice commands. It may provide feedback, typically through a screen or other monitoring system, as well as providing spoken words in ordinary speech to a user.

To this end, the APA 12 may be provided with a portal 43 to access it for programming or configuring by an engineer, not the user. A radio 148 in the APA 12 serves as a connection system 148 for a mesh network 51 of various room devices 17 such as entertainment devices 17*c*. Also, the devices 17 may include other mechanisms, including environmental controls 17*a*, such as thermostats, lighting, humidity, air circulation, and the like.

In addition, other devices 17 may include, for example, appliances 17*b*. Appliances 17*b* may be auxiliary lighting, coffee pots, refrigerators, other electrical devices, and the like. In some instances, appliances 17*b* may even include stoves, microwaves, and the like. Some of the most useful appliances end up being simple devices like coffee pots programmed to provide a hot brew early in the morning, begun before a user has awakened. However, any or all of the devices 17 need not have a processing board. They may be controlled by a simple on/off switch or controller.

Similarly, other appliances may include a clock, such as an alarm clock, or a combination clock radio. In some respects, a radio may be considered an entertainment device 17*c*. On the other hand, an alarm clock is very much a utilitarian appliance 17*b*.

In certain embodiments, a system 10 in accordance with the invention may be connected through the Internet 18 to several services "in the cloud." The cloud refers to systems that need not be permanent, nor always use the same computer, but are connected through the Internet 18 to be identifiable, more accessible remotely, and provide services, storage, and the like.

For example, in the system 10, a property management system 14 may actually be installed within a physical property 22, such as a hotel 22. Nevertheless, such a property management system 14 may also be positioned or distributed somewhere across the Internet 18 at some distance away from the actual APA 12 and the property 22. Of course, the property management system 14 may include its own dedicated database 15 or property management system database 15. In the database 15 are contained the records required for managing the property 22.

One of the more valuable features of the property 22, and the functioning of the overall system 10 is a personal network 20. The personal network 20 provides access to the Internet 18 through the APA 12 or access point assistant (APA) 12. The APA 12, tentatively named Angie 12, provides a personal network 20 in which the various devices 52 connected within the personal network 20 are not isolated from one another.

That is, the APA 12 is programmed to not require, nor provide in its default condition, "device isolation" within the personal network 20. Thus, any device 52 within the personal network 20 may connect to the Internet 18 through the APA 12 yet see all of the devices 52 in the personal network 20.

This would typically be a security problem for other systems. However, here, every device 52 within the personal network 20 is under the control of, and is typically owned by, a single user. These various devices 52 are "visible" to each other throughout the private, password-protected, personal network 20. All may be logged in to the Internet 18 through the APA 12. The personal network 20 need not be connected to the Internet 18. It may simply connect to the local area network 50 or wireless local area network 50, which will have device isolation security, on the property 22.

Referring to FIGS. 1 through 7, in certain embodiments, the services and various functionality used and relied upon by the APA 12 may actually be remote from the property 22. Typically, across the Internet 18 various hardware and software may exist to implement functionality accessed by the APA 12.

For example, voice recognition systems 26 may be one or many, but will typically provide a speech-to-text system 26 (STT 26) or voice recognition system 26 of hardware and software. The voice recognition system 26 is programmed to convert spoken language to text or characters that can then be processed as collections of characters or values as any other computer data.

Likewise, a natural language understanding system 28 or unit 28 (NLU 28) may connect to the APA 12 through the Internet 18. The natural language understanding system 28 or NLU 28 may include a software program programmed into a hardware device in order to process text representing a natural language by parsing it and analyzing it to establish context, meaning, and specific requests and information (e.g., cognizable commands).

Similarly, a text-to-speech engine (TTS) 30 provides generation of a file that may output to or control speakers. This TTS engine 30 provides an audio output or a file that the APA 12 will convert into an audio output communicating, to a user, requested information in natural language. Various TTS engines 30 may operate by programmatically selecting and outputting files containing spoken phrases of language. In some embodiments, a TTS engine 30 may actually generate statements or questions in a natural language based synthesis or a synthetic voice or sound system that mimics a human voice. In other embodiments, statements may be connected from, or formed by, connecting spoken words that are selected and assembled according to a particular algorithm for a TTS engine 30 known in the art.

It can be seen that the APA 12 may receive a voice command spoken by a user, send the data represented by that voice signal through the Internet 18 to the STT system 26. The STT system 26 may then submit a text file to the NLU 28. The NLU 28 thus determines what the effect or actionable item is that was requested in the statement made by the user to the APA 12.

By way of outputs, the APA 12 may send data to the speaker driver of the speaker. The output of a TTS engine 30 reflects an answer, instruction, or other communication. It may include a question for verification or the like, generated by a system 10 as a response to a request from a user speaking to the APA 12.

In certain embodiments, a telephone exchange 32 or the like, such as a PBX 32 may provide telephone services for a user operating through the APA 12. Thus, VOIP systems and the like may operate to provide telephony services to a user speaking to the APA 12. In this way, the PBX 32 or other telephonic exchange system 32 may actually provide phone calls to the world outside the property 22.

Similarly, the APA 12 may communicate over the Internet 18 to an agent management site 34 or AMS 34. This management console 34 may be hardware dedicated to the task or a website on a computer that provides all the programmatic management functions required by a user, by the APA 12, or both in effecting the access and control desired by a user. More will be described hereinbelow with respect to each of these remote systems operable by the APA 12 through the Internet 18. In certain embodiments, some or all of the systems 26 through 46 may actually be programmed into the APA 12. However, it is architecturally more robust and considerably faster if most processing is not required to be hosted by the APA 12 itself.

The property management system 36, for example, involves several aspects of managing the property 22. The property management system 36 needs to be managed for the satisfaction and comfort of a user pertaining to the APA 12 and personal network 20, on the one hand. Thus, the property management system 36 has certain systems, including software programmed into hardware, and accessible by the APA 12 on behalf of the owner of the personal network 20.

On the other hand, the property management system 36 also includes software programmed into hardware to monitor data and provide reporting to owners and management of the property 22. These two types of information are considerably different from each other (and from guest information or data). The latter (management data) applies to, for example, hotel accommodations, needs of guests, daily operations, and the like. The former pertains to the functioning, business decisions, and unit operations of the property 22 as an asset, of some concern to the management, but more directly to the ownership thereof.

A loyalty database 38 may be accessible across the Internet 18 and contains various information. For example, the loyalty database 38 may include records for various guests associated with the property 22. The property 22 may be a hotel or other facility owned by a particular company. That company may provide various levels of perks based on status, recorded through loyalty cards held by its frequent guests. Accordingly, the company owning the property 22 may keep a loyalty database 38 identifying records corresponding to those guests.

The loyalty database 38 may include various detailed information regarding preferences, activity patterns, venues frequented, as well as any number of personal preferences for the environment and entertainment options available on any given property 22. Meanwhile, just as the property management system 36 may include data corresponding to hospitality toward a user in a room furnished with an APA 12, the loyalty database 38 may also include information principally of interest to the owner of the property 22. Thus, the loyalty database 38 may have both user-accessible information as well as management-accessible or owner-accessible information.

In certain embodiments, a user preferences database 40 may be included within the loyalty database 38. In other embodiments, the user preferences database 40 may actually stand alone. For example, the APA 12, in providing for the needs and desires of a particular owner of a personal network 20 as a guest at a property 22, may access the user preferences database 40. This may also be referred as the agent-user preferences database 40. This is because the APA 12 actually may access the database 40 in order to determine selection and settings to control the various organic (e.g., built in or property-provided) devices 17 operated by a room control, the APA 12, and any aspect of the features the APA 12 provides.

A property 22 in which a perspective guest has reserved a room may automatically act through the APA 12 in that reserved room to set up various devices 17 including environment 17a or environmental devices 17a, appliances 17b, entertainment systems 17c, and the like. In some embodiments, a separate database 40 associated with a user may be beneficial. However, the APA 12 will be an installation on a property 22 by the owner of that property 22.

In certain embodiments, the agent-user preferences database 40 may as well be a part of or embedded within the records of a loyalty database 38. In other words, many of the details associated with a particular user or guests on a property 22 may be associated with the loyalty program as documented in the records of the loyalty database 38. Since the owner of the property 22 installs, through the management or otherwise, the APAs 12 in the individual rooms of the property 22, the most practical implementation of the agent-user preferences database 40 may be as a part of the loyalty database 38.

This may be implemented by having specific records directed to the database 40 or simply by having the data needed for the database 40 implemented in various fields and tables of the records of the loyalty database 38. Also, as a practical matter, the database 40 may have only limited value across platforms between differing owners of properties 22. Thus, embedding the database 40 or linking it to the loyalty database 38 may actually be the mechanism most typically used.

For many informational services 42, the providers will usually be third parties who are unassociated, unaffiliated, or otherwise unconnected to the owner of the property 22, and the guest user of the APA 12. Thus, third party information services 42 may be accessed across the Internet 18 by the APA 12.

For example, local services including restaurants, theaters, sporting venues, shopping venues, and the like may be of interest to a guest at the property 22. Accordingly, the guest may access information regarding services, commercial locations, maps, instructions, menus, catalogs, and the like by requesting the APA 12 to find such information. The APA 12 may then access over the Internet 18 third party information services 42 in order to return a response.

One benefit of the architecture illustrated is that the voice and language systems 26, 28, 30 may operate to receive voice requests and queries from a user to an APA 12. It then passes voice files out to the STT system 26, which does initial processing and then passes off a text file to an NLU system 28. The NLU system 28, may then pass a command file back to the APA 12 or elsewhere for ultimate delivery as a query or request to a third party information service 42. The third party information service 42 may then pass a file back to the APA 12, which submits it to the TTS engine 30 in order to facilitate the return of a voice file to be played back by the APA 12 through a speaker to the user at the property 22.

Other systems 44 may be accessible by the APA 12 over the Internet 18. These may include any number of functions and services. For example, third party information services may be hosted in hardware to provide information. However, commands, purchases, orders, tickets, and the like may be ordered directly by the APA 12 from other systems 44, such as computers (e.g., servers, portals, websites) of ticket sellers, sporting venues, theaters, and the like.

In some respects, third party information services 42 may provide more than services. However, as a practical matter, information services 42 typically provide answers to questions. Other systems 44 may actually provide physical services, including streaming of movies, streaming of videos, streaming of music, purchase of products, ordering laundry services, purchasing clothing, or any other commercial transaction.

An important functionality for a system 10 may be a publication/subscription system 46. It facilitates communications between distributed components of the system that need not necessarily be aware of one another's existence.

The publication/subscription system 46 or the PUB/SUB 46 may receive information published by any system in the system 10. Reports on status may be made by any hardware that is network aware (connectable and identifiable on a network). It has a hardware address for access from the Internet 18 or any LAN 50 on a property 22 or the like. Thus, information may be published to the PUB/SUB system 46 by suitable identification, command structures, and forwarding the information.

Systems having subscriptions to the PUB/SUB system 46 may then be automatically notified whenever data is supplied to the PUB/SUB system 46. Meanwhile, the information need not be highly volatile, but may remain accessible to all systems desiring or programmed to access and use it.

Figure 2:
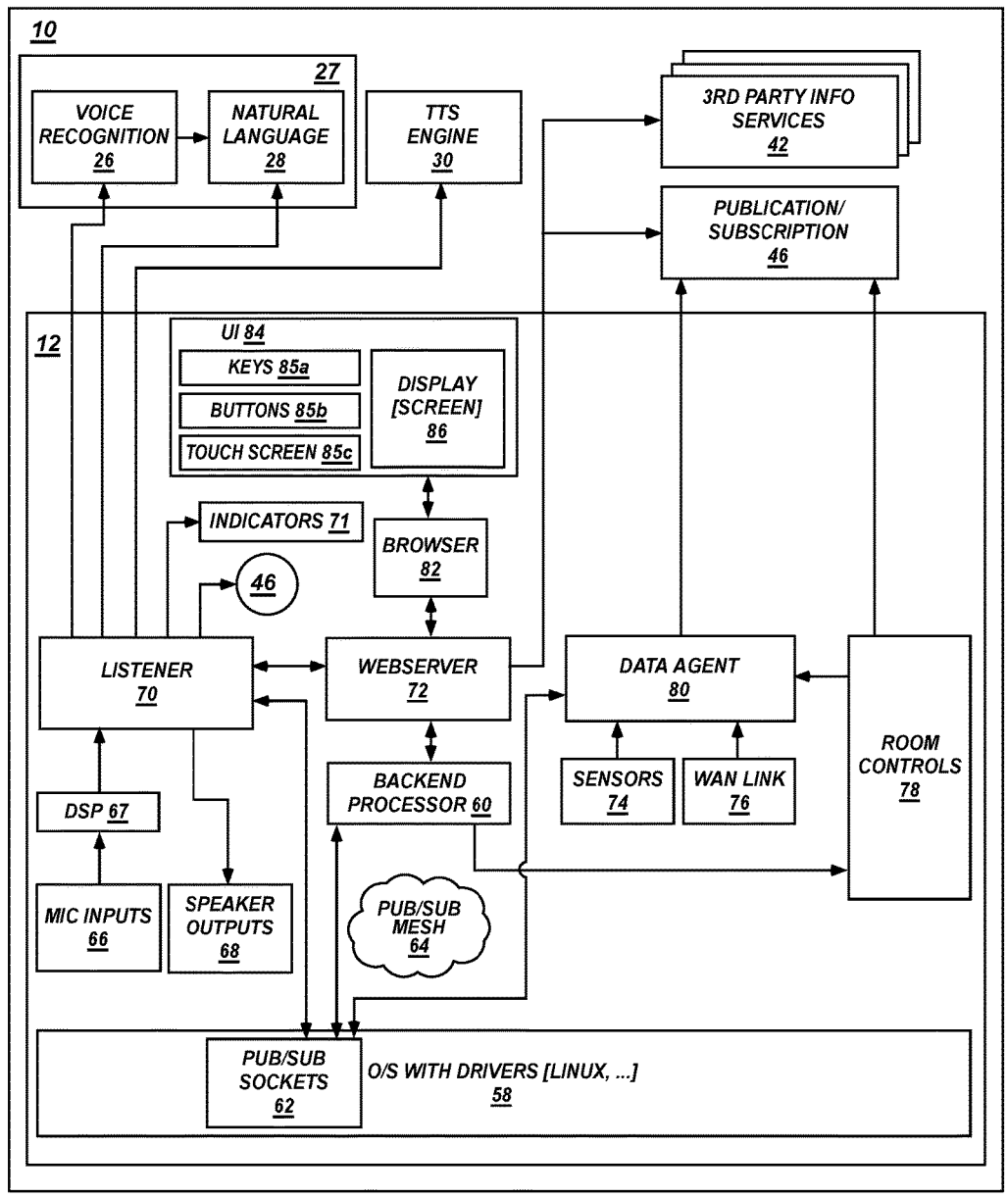
FIG. 2 is a schematic block diagram showing selected elements from FIG. 1, including additional details for an access point assistant (APA) or agent system operating as an access point or switch of a network and also as a router through which access to another, more conventional network and to the Internet is obtained.

Referring to FIGS. 1 and 2, while continuing to refer to FIGS. 1 through 7 and 8 through 16, generally, the system 10 may include various hardware programmatically controlled from within the APA 12.

Meanwhile, the ISP 48 may connect the LAN 50 to the Internet 18. Thus, the APA 12 may access any of the systems 26 through 46 to procure services and information for the user of the APA 12.

Typically, the APA 12 may include the components required to interface with the user as well as the various devices within the room of the property 22. For example, in one embodiment, the APA 12 may include a processor, described in some detail hereinafter, programmed with an operating system 58, including drivers. Typically, the operating system may be any one of several types available. In one embodiment, a Linux operating system has been programmed to perform the functionality.

A microphone 66 may be connected through a digital signal processor 67 to a listener 70. Typically, microphone electronic devices receive voice signals and translate those sound waves through a transducer into a sound file of analog data. The microphone 66 or the microphone input 66 feeds data to the listener 70.

The listener 70 is connected to the web server 72, typically using an application programming interface API of protocols and commands by which to communicate back and forth with back end processor 60 and other systems. Accordingly, the listener 70 may receive microphone input 66 and send speaker outputs 68. It will control sound audio signals originated by or perceptible to a user. Thus, the speaker outputs 68 may be thought of as outputs of a listener 70 to speakers 68 or speaker systems 68.

The listener 70 is operably connected to the voice recognition system 26, natural language understanding system 28, and the text-to-speech engine 30 or TTS engine 30. Those systems and engines may be off site and will usually be more efficient, or at least faster if they are processing large sound files somewhere other than inside the APA 12.

The data agent is the active aspect that "polls" devices for their current state and thereby collects data on each. Meanwhile, the room controls 78 are monitored or otherwise reporting to the data agent 80 those data that reflect operation thereof. Thus, both the signals for request, the outputs, and any sensor data may be provided to the data agent 80.

Room controls 78 need not talk to pub/sub 46. The data agent 80 exists to facilitate this communication, principally because there is a change of protocol involved. We can thus regard data agent 80 as a type of protocol converter shifting data from various different formats into the unified pub/sub 46 format. Similarly, the data agent 80 may send some or all of its information to the pub/sub system 46, from which it may be extracted by request from various other components or systems.

Similarly, the back end processor 60 or any component in the APA 12 may also pass data to the pub/sub systems 46, third party information services 42, and the like. Typically, a browser 82 may be operably connected to the back end processor 60 through the web server 72 in order to present information that may be useful or required in accessing the Internet 18. A user interface 84 on the APA 12 may rely on the browser 82 but may also include keys 85*a*, buttons 85*b*, keyboard 85*a*, touch screen 85*c*, or the like in order to interact with the browser 82.

Familiar user interfaces 84 may provide a full keyboard 85*a*, limited or robust console in a display screen 86, certain option buttons 85*b*, touch screen 85*c* with graphics, commands and menus, or the like. Any label in rectangular brackets in the figures herein indicates an optional item.

Typically, a display 86 or display screen 86, such as a monitor 86, television 86, or small screen 86 may be a satisfactory communication mechanism from the browser 82 in order to display options, commands, interpretation of voice commands, or other speech, images, or especially conventional images of websites visited and the like, as accessed by the browser 82.

Thus, one may see that the APA 12 is far more private, yet robust and feature rich than any conventional access point. Moreover, the APA 12 may effectively implement all the functionality needed by a user from a computer by voice commands through the listener 70 with no need for a conventional computer tower, a conventional monitor, a conventional keyboard, or the like. On the other hand, through the user interface 84, a user may actually interface with the browser 82 by conventional mechanisms as well as through voice commands via the listener 70.

Perhaps one of the most valuable functionalities of the APA 12 is the ability to be pre-programmed to control data access thereto. For example, among the commands to room controls 78 of that are input, the APA 12 may download a guest's favorite settings for devices 17 when a new guest checks into the room. It is also not only the room controls that can be set. It is any aspect of the APA 12 that might be regarded as a setting or preference. The APA 12 may be assigned a permitted bandwidth limit. Accordingly, a programmatically controlled bandwidth limit may be set as a policy decision from the hotel, entered as configuration in the property management system 34, and enforced by the APA 12. This has heretofore been highly problematic.

A user may stream to a laptop 52*a*, music, video, or the like. Likewise, the laptop computer 52*a* may download data of many other types. Meanwhile, an entertainment device 17*c* may stream audio, video, gaming commands, downloads, or the like.

In conventional networks, there is no personal network 20 allowable between guest devices 52. Rather, any individual devices 52 must connect to the network 50, and may have imposed on them, for security purposes, device isolation. None of the devices 52 need be aware of one another or be able to see one another. Device isolation is good for security over a network 50. It is good in a public network because one cannot guarantee that any two devices that might wish to communicate with one another should be allowed to do so. Typically this is governed by device ownership. Devices owned by the same person might reasonably be allowed to communicate, but devices owned by different people should not normally be allowed to communicate for reasons of privacy and security. One does not want one's personal information shared with strangers who happen to share a wireless network.

Figure 11:
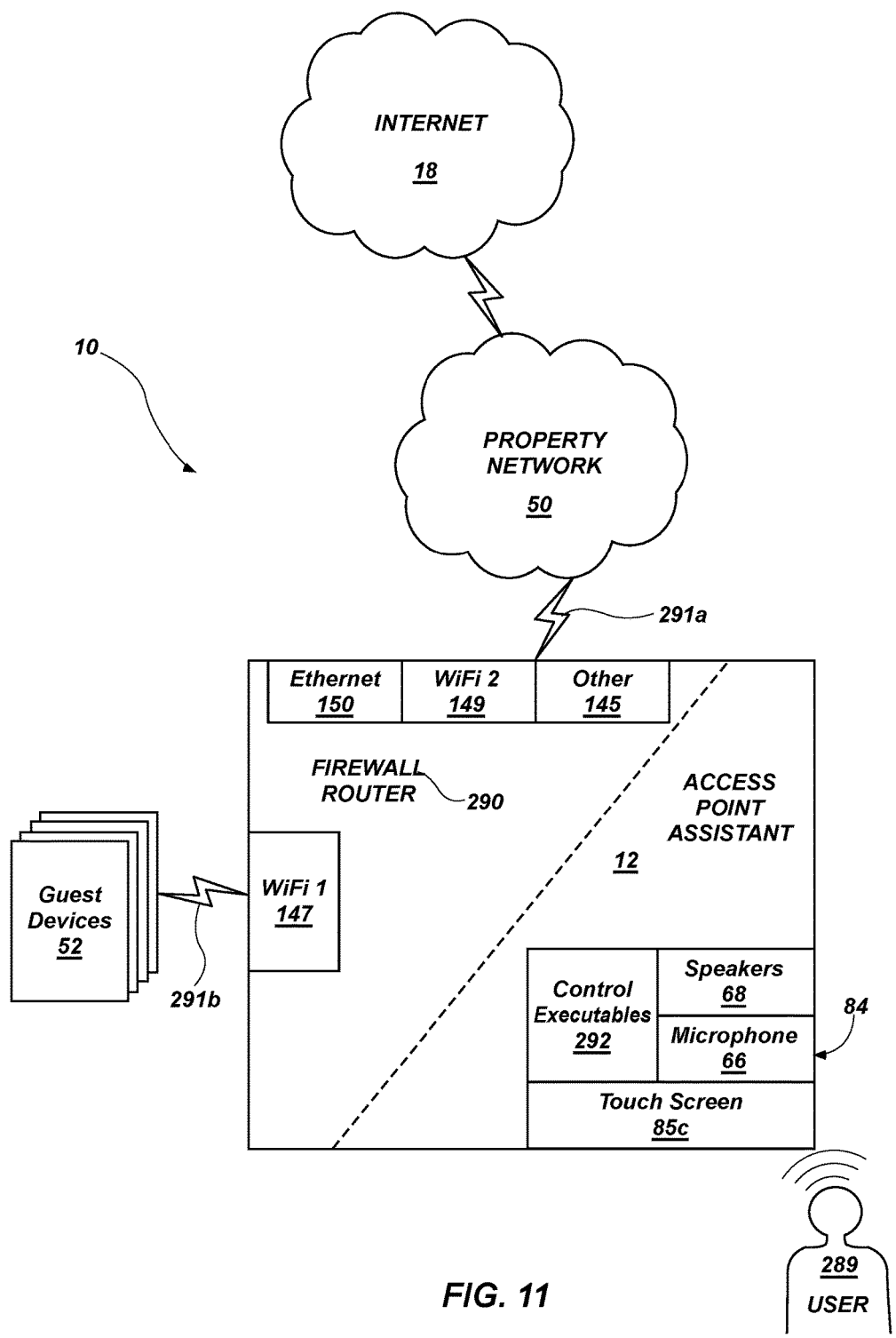
FIG. 11 is a schematic block diagram of the connection of an APA with its firewall router interacting with personal devices of a guest to send information over a property network (LAN/WLAN) through the Internet and on to other third party services in the cloud.

However, because each room has its own APA 12, each APA 12 is effectively the facilitator, hub 12, or switch 12 in a personal network 20 with its own web server 72 and firewall router 290 (FIG. 11). The various devices 52 may all connect to the APA 12 in a personal network 20 without requiring therein any device isolation. Within a single room, the system 10 can guarantee commonality of device ownership, or at the very least, the occupant of the room has the option to allow (or not) other devices on the network to facilitate sharing of information.

A guest may customize a personal network 20 so it matches another. For example, configuration data, such as the network name and passwords that the personal network 20 has, "at home," "at the office," or elsewhere that the devices 52 commonly operate, may be maintained.

Thus, the user (e.g., guest) need not be concerned with configuring the personal network 20. The personal network 20 may configure itself, or may do so, in conjunction with communications to the APA 12. Thus, the personal network devices 52a can "see" each other across their personal network 20. Yet the network 20 may still have device isolation across the property network 50 from other users (and APAs 12) in other rooms on the property 22.

Device isolation is in place for security purposes between different rooms, but need not exist and should not exist within an individual room operated by a single APA 12. Meanwhile, the personal network 20 has its own passwords known only to the user of the devices 52 on the personal network 20 and data transfer is encrypted. This is in contrast to conventional public WiFi networks where anyone snooping can see the data being transferred in the clear. Thus, it cannot be accessed nor easily hacked or otherwise have its security breached by other users on the property network 50.

A robust setup and configuration of the personal network 20 with a minimum of intervention by the owner of the personal network 20, and less by the property manager, is now possible. Moreover, the devices 52 in the network 20 may see each other directly and access information that would otherwise be unavailable due to device isolation. At the same time, the property 22 can impose device isolation on the network 50, between all APAs 12 and the devices associated with each thereof.

Moreover, an individual user of a personal network 20 may request, select, pay for, and otherwise establish a limit on available bandwidth. This limit may control what is to be passed through the APA 12 to the personal network 20. In this way bandwidth is controlled at the lowest "atomic level" of an individual APA 12. The APA 12, by controlling bandwidth, assures that the LAN 50 is never overwhelmed by an unknown consumer.

For example, in conventional networks, devices associated with a network can freely transmit information without regard to whether the network can handle it. Demands are simply imposed by packets to or from the personal devices 52 individually logged onto the network 50. Not only would all of the devices 52a, 52b, 52c, 52d be isolated from one another, but each could stream bandwidth at a rate unknown and uncontrolled by the network 50. Instead, the network 50 if implemented in a conventional configuration would simply provide or consume bandwidth according to the demands received. Thus, the network 50 would have had no mechanism in a conventional system for limiting bandwidth before packets all arrive at the hub controlling the network 50.

The Lan 50 is simply a network. There may be monitoring tools employed by the owners of LAN 50 to examine the bandwidth used by an APA 12, but it is not within the scope of the APA 12 to be concerned with whether owners of LAN 50 do this. A system in accordance with the invention does, however, measure the bandwidth used by an APA 12 and report this information to its own management system.

The listener 70 is responsible for handling voice interactions with a user. For example, the listener 70 receives microphone inputs 66 or receives signals 66 generated by voice interactions by a user through the microphone input device 66 and software 66 (all are represented schematically by item 66). These inputs 66 are processed through a digital signal processor 67 in order to be recognizable by the listener 70. No file need be created in the conventional sense. The audio data is simply read from the microphone input device and processed by the listener 70 in memory without being stored anywhere in a persistent manner, such as a file.

Another functionality programmed into the digital signal processor 67 is processing of patterns in order to recognize a particular signal pattern corresponding to a voice command of recognition. For example, a user may use a trigger phrase such as "hello blue genie," which has been generated as a voice statement, received by the microphone input device 66, which is then processed by the digital signal processor 67, and recognized as a wake up call for the listener 70. Thus, the digital signal processor 67 sends a command to the listener 70 requesting and requiring activation of the listener 70.

Just as a packet header on a digital packet over a network identifies the information to follow, the listener 70 begins recording all signals following a wake up instruction from the digital signal processor 67. That information is used as the listener 70 logically determines when conditions are detected that indicate an end of an utterance by a user. Thus, the listener 70 will create a stream of data, or the like, and pass that information to the voice processor 27, and particularly directed to the voice recognition engine (VRE) 26.

The voice recognition engine 26 processes the data by converting the digital interpretation of speech signal into words. Those words are then output as character strings (text) to the natural language engine 28. The natural language understanding engine 28 or NLU engine 28 then parses the stream of words to determine meaning. Much detail regarding the voice recognition engine 26 and the natural language engine 28 is unwarranted at this point. This technology is well developed, and is available in commercial devices, including the software Dragon Naturally Speaking™ available commercially, the Siri™ system available on devices provided by Apple™, as well as other commercial products.

From the natural language engine 28, the voice processor 27 sends back to the listener 70 the meaning of the spoken language in the form of an actionable command. Accordingly, the listener 70 now forwards to the web server 72 the actionable command for execution. Accordingly, the web server 72 receives the command and operates on it according to the protocol of the web server 72.

The user interface 84 provides access to the browser 82 operating on the APA 12. The user interface 84 provides a mechanism 84 by which a user may communicate back and forth with the browser 82. For example, a display screen 86 may provide information. Meanwhile, a keyboard 84a or other keys 84a may provide for tactile inputs by a user. Similarly, buttons 85b may be physical buttons or may be virtual buttons on a touchscreen 85c. The display screen 86 may be thought of as the visual output to a user, while the keys 85a, buttons 85b, touchscreen 85c, and the like constitute a user input system 85.

In certain embodiments, an additional device 71 or set of devices 71 may be constituted as indicators 71. Certain activities, status, and the like of the listener 70, the APA 12 in its entirety, or the like may be provided readily by indicators 71 such as LED lights 71 having different colors, steady glow, blinking, or the like to indicate immediate status to a user.

As a user now interacts with the web server 72 through the browser 82, the web server 72 relies on a backend processor 60. For example, the backend processor 60 receives the actionable commands from the web server 72 that the web server received from the listener 70 in consequence of the natural language engine 28.

The listener 70, the data agent 80, responsible to collect various statistical and other information, as well as the backend processor 60 are in communication with publication/subscription sockets 62 provided in the operating system 58. Thus, these devices 60, 70, 80 constitute a publication/subscription mesh 64.

For example, they communicate effectively peer-to-peer, thus creating a de facto mesh network 64. The operating system 58 basically provides the sockets 52 that constitute the locations in the operating systems 58 where information can be parked and retrieved by the members of the publication/subscription mesh 64.

As a practical matter, the sockets 62 typically operate more like a pipeline than as memory registers. Thus, any information received by a socket 62 is transferred to a subscriber or all subscribers to that socket 62.

Figure 3:
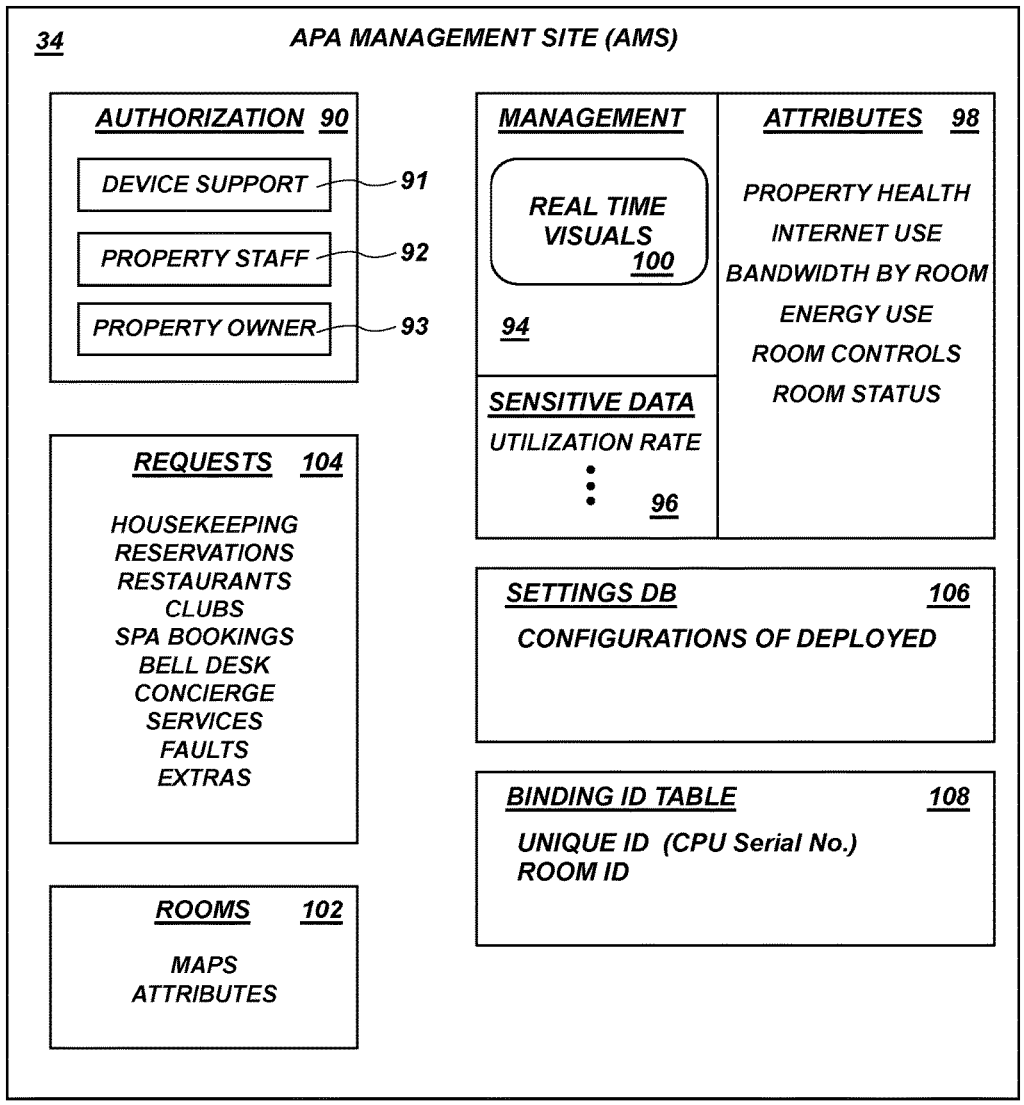

Referring to FIG. 3, while continuing to refer generally to FIGS. 1 through 16, the APA management site 34 (AMS 34) may be implemented in a computer programmed with several functionalities. For example, the authorization system 90 includes an agent support system 91, a property staff system 92, and a property owner system 93. Typically, an authorization system 90 has the responsibility to implement an algorithm effectively, and may include software, hardware or both. A user requests an authorization code. The system 90 receives that operational code, processes the code by comparing it against a standard table of approved codes or processing it as a key.

Cryptographic keys may be evaluated by a variety of numerical techniques that effectively mathematically process a number key to match a code and approve access. Nevertheless, password protection may suffice. Typically, in an authorization algorithm in accordance with the system 90, an interested party, whether that is an APA 12, a computer associated with staff on site at the property 22 responsible for the physical and other infrastructure support and maintenance, including guest services and comfort, or the like may be represented by a property staff system 92 or computer 92.

Similarly, the property owner system 93 represents a computer, its software, or both, affiliated with an owner of the property 22, such as a management company or property ownership company that effectively owns and controls a number of different properties 22.

Accordingly, each of the systems 91, 92, 93 will typically be accessed through logging on to the AMS site 34, after which they may log into an authorization system 90, launch an authorization system 90 from the menu, or be presented with a dialogue box communicating with and controlled by the authorization system 90. Accordingly, a code or password will be required.

Upon input, into the system 90, of the correct code or password, or any password or code for that matter, the authorization system 90 will then evaluate the validity by comparison. This may be done with a lookup table, chart, comparison, by conducting a numerical calculation, or the like in order to verify that the code is correct or authorized. Upon successful validation, the authorization system 90 will return a notification that the authorization has been accepted and will make available more menus, dialogue boxes, and buttons on the AMS site 34.

If authorization is denied by the system 90, a notification will be sent. After a certain number of failures, the individual accessing the AMS system 34 may be blocked from further access.

A management system 94 may include real time visuals 100 such as photographs, video feeds, audio feeds, print outs, or the like. Typically, the real time visuals system 100 may actually provide information to management by way of images (e.g., photos, video) of a particular location at the property 22.

In other embodiments, real time visuals 100 may include tables, charts, dynamic images, rows of figures, and the like that will reflect data accumulated by the pub/sub system 46 monitoring various hardware or other detectable conditions through sensors 74. Thus, the management system 94 is principally responsible to report back to individuals who come through the property staff authorization.

A sensitive data system 96 may provide highly controlled information, such as that available only to the property owner authorization 93. Sensitive data may include such information as utilization rates, financial data, and other proprietary data that is not generally necessary to anyone other than highest level managers among the property staff authorization 92, but more typically the owner, through the property owner 93 (or its devices) in the authorization system 90.

Attributes 98 that may be reported through a management system 94 may include property health, and include financial analysis data, aging information, infrastructure condition, lifetime, or projected life, Internet use, bandwidth by individual room, energy or other resource used by floor, wing, room, or the like.

Attributes 98 may include parameters signifying settings or outputs from room controls 78, the status of various aspects of a room, or the like. Other attributes 98 may include any data corresponding to control of software, streaming bandwidth, any of the devices 17 in the room, or the like. Typically, attributes 98 will contain or have values representing data corresponding to the use, costs, repairs, and the like of facilities and functions.

Thus, attributes 98 may include detailed financial data as to rooms available, rooms rented, the cost at which each room is rented, as well as costs of cleaning supplies, the repair materials, paints, and so forth. In other words, it may include the data necessary for management to provide a positive guest experience, management of the property 22, as well as the ownership data required.

This may include data sufficient to know or access financial expenditures, audits, and the like, all available through the management system 94 presenting selected attributes 98. These may be presented in real time visuals 100 whether those visuals 100 are numbers, charts, graphs, images of physical locations, or the like.

Sensitive data 96 may simply be sequestered or limited in access to specific individuals or specific passwords based on a need to know and right to know, administered by the authorization system 90 through the agent support system 91, property staff system 92, or property owner system 93.

Individual rooms of the property 22 may have room systems 102 associated therewith. Typically, these may serve, present, and store maps, as well as specific attributes from a database or table. The attributes, maps, and other information provided by room system 102 may work with and serve a subset of the attributes 98 in the management system 94. Again, assuming that an object oriented programming approach or a framework approach is used, the management system 94 may represent executable code (an executable), programmable into a processor. The attributes 98 reflect the data contained therein or in the database providing the data that identify or reflect the values of attributes 98.

In this way, the room's system 102 may provide information directly through executables 102, or simply provide data 102. Thus, the rooms system 102 may represent executables operating on a computer, or other data provided by executables operating on a computer.

The requests system 104 operates in a rather straightforward manner by typically providing menu options as to what is desired. Typically, a request system 104 is associated with guests. Accordingly, the requests system 104 may operate as a query engine and database in which a user may speak a request, select a query, type in an input, or check on a selection from a menu of available items.

For example, requests may be directed to a destination or a class of personnel satisfying that request. In other embodiments, requests may be typed into a dialogue box in natural language to be input and processed.

Requests may be for a specific function or for a particular group of personnel or type of personnel. For example, requests in the request system 104 may be directed to housekeeping operations, a reservation desk, a restaurant affiliated with the property 22, clubs, a spa, a bell desk, a concierge desk, other services, or the like.

In addition, requests from the request system 104 may be directed to problems or faults for which a guest does not know the responsible agency. Meanwhile, extras such as additional requests or materials for a room may be requested. These may include bathroom supplies, additional blankets, a child crib, or other non-standard, yet available extra services or materials.

A request system 104 may typically operate on a menu basis or on a dialogue box basis. In other embodiments, the request system 104 may simply receive a voice input from the listener 70 as described hereinabove which voice input is processed and passed on to the appropriate personnel for fulfillment.

A settings system 106 may be implemented in hardware, software, executables, data, or a combination thereof. Typically, the settings system 106 will provide a configuration of deployed APAs 12 on a property 22. Thus, once an APA 12 has been installed, the settings system 106 will obtain the general configuration data for that APA 12 and replicate the reusable data therefrom to control other APAs 12 associated with other rooms 102. Typically, configuration data for the APA 12 will be divided between those parameters that apply to an individual room (private network 20), and those that apply to the system 10 generally at a property 22.

One set of important attributes may be found in a table 108 that reflects identification of each of the APAs 12. Upon installation, each APA 12 may be programmed, or the table 108 may be populated with ordered pairs of unique identifiers (e.g., serial number of CPU, etc.) and corresponding room identifications.

Room numbers are typically well known and may be mapped for a particular property 22. On the other hand, another unique identifier of hardware, such as a serial number may be read by querying an APA 12 at installation or some other time. Mapping a real address (room location) to a hardware device serial number provides a comparatively stable pairing.

Meanwhile, a network 50 by whatever mechanism will typically include a number of portals or ports to which APAs 12 are each connected. Each network port will be unique. Thus, the table 108 or software, hardware, and data in combination may be programmed to create and provide back an address for an APA 12, the port number by at which that APA 12 is connected to the network 50, and the associated room identifier at which that APA 12 is located. Other useful data may also be maintained by the agent identification system 108 which may be implemented in a table 108, of APA identification information.

Figure 4:
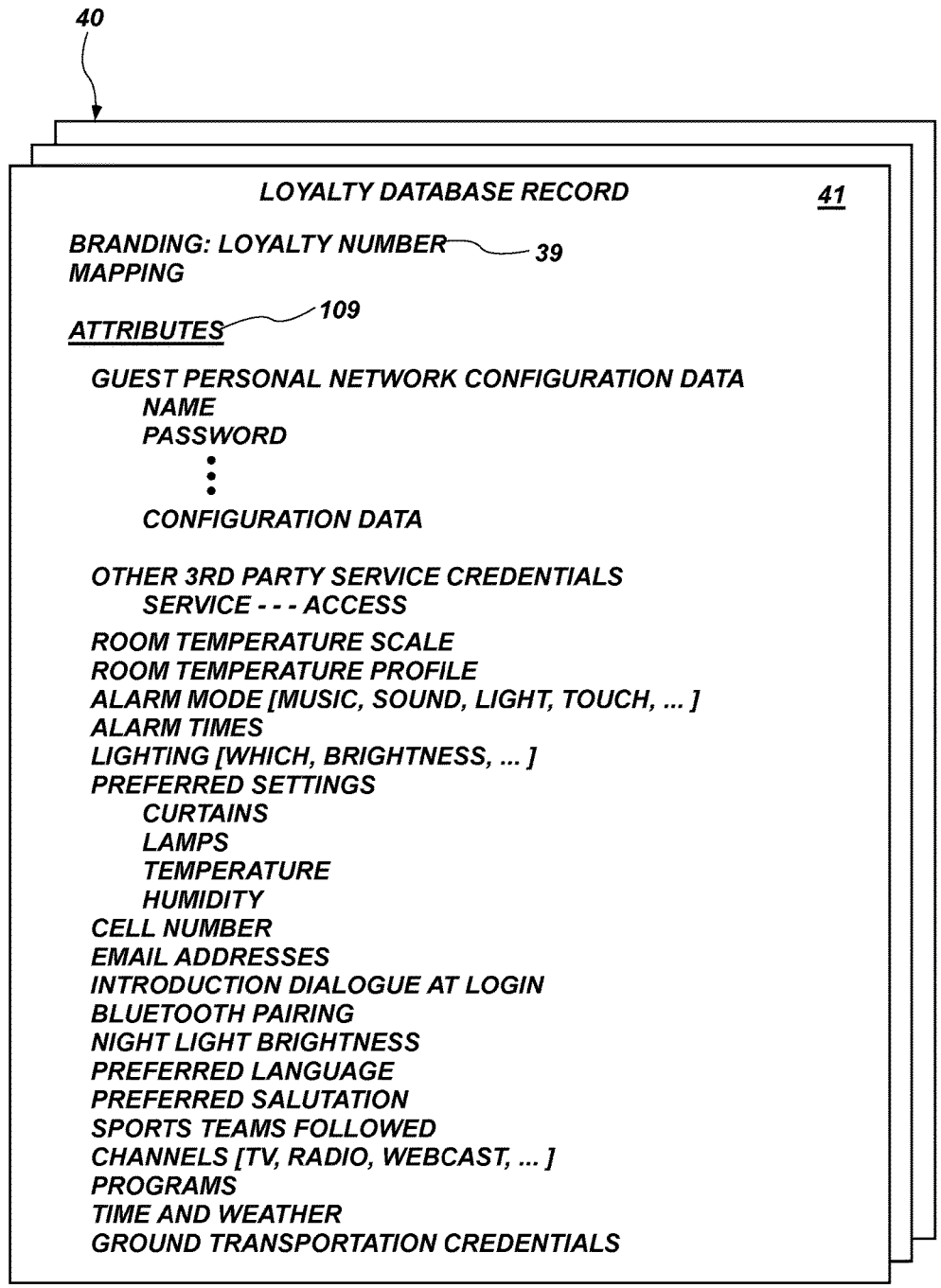
FIG. 4 is a schematic block diagram of a loyalty database record corresponding to an individual user having a personal network connected to an APA in a local area network on a property.

Referring to FIG. 4, while continuing to refer generally to FIGS. 1 through 16, a loyalty database record 41 may be contained in a loyalty database 38, or individually in a preferences database 40 which may be part of or independent from the loyalty database 38. One reason why the preferences database 40 may be a part of or within the loyalty database is that the database owned by the property owner might not be accessible or suitable for our purposes and will therefore be necessary to build our own separate system. On the other hand, the owner's database might contain some information we find useful and the two systems can effectively operate in parallel accessing certain fields of information from one system and other fields from the other.

Accordingly, that property 22 is associated with the owner. The owner, such as a hotel company, will then have a loyalty database. Thus, in certain circumstances, the APA 12 is part and parcel of the infrastructure built onto a property 22 by an owner thereof. Nevertheless, the database 40 may stand independently from the loyalty database 38 or may be included therein.

The loyalty database record 38 illustrated may typically include a loyalty number 39. This loyalty number 39 is a unique identifier within all customers of an owner of properties 22. Associated with that loyalty number 39 may be a host of attributes 109. Again, attributes 109 may be highly individualized, but some may be more generalized and may pertain to multiple users or customers.

For example, some of the attributes 109 may include a guest personal network name. Similarly, a guest may receive, or more likely create or already have, a password for the personal network 20. Meanwhile, other configuration data for that personal network 20 may also be included, but not necessarily. Accordingly, guest personal network 20 configuration data may include the foregoing information and other data that will assist in hosting the personal network 20 on the APA 12 to effectively exchange data with each of the devices 52, in the personal network 20.

In addition, other attributes 109 may include other third party servers', credentials in order to provide service and access. These may include search services, online databases, or other third party information services 42 along with the username and access code, such as a password, for the owner of the personal network 20 to access functions and features regularly used.

For example, a weather program, a favorite online entertainment site, or the like may be identified in third party service credentials. Also, for example, a third party service provider 42 by name, website, URL (uniform resource locator), or the like may be in a table that identifies the services, access codes, and the like for rapid access without having to input them again.

In addition, such conveniences as the room temperature scale, whether Celsius (centigrade) or Fahrenheit, at the preference of a user, may be included. Similarly, a room temperature profile may be saved. A room temperature profile may include a temperature for sleeping, a temperature during day time, occupied, unoccupied, lead times before each, and may include various values and times at which those set points should be instigated or prevail according to the comfort, perceptions, and preferences of a user.

An alarm mode may be shared by the APA 12 with an appliance 17b of the devices 17 on the property 22. A trailing letter following a reference numeral, anywhere herein, indicates a specific instance of the item identified by the reference numeral. Accordingly, it is proper to speak of a referenced item by number, as a type or class, whereas a number followed by a trailing letter indicates a specific instance of the item referenced by the number.

Alarm modes may include preferences to be shared by the APA 12. These preferences are to control the alarm feature of the APA 12, not something offered by an external device.

Along the same lines, times for alarms, and types of alarms, which may vary with the alarm mode may also be programmed into the APA 12 out of the attributes 109 from a loyalty database record 41. For example, wake up times, call times, appointment times, travel times, and the like may all be reflected in alarm time. Moreover, alarm times may be shared between devices 52 in the personal network 20 and devices 17 that are more audible. Thus, the APA 12 may use information from the personal network 20 or devices 52 therein as program data to set alarms on the devices 17.

One personal preference that varies somewhat dramatically between guests and hotels, and which varies substantially with a task at hand, is lighting. Which lights in the room are to be used, what brightness settings they should have, and so forth are a matter of personal preference and utility to individuals. Moreover, a common complaint is that lighting is insufficient. This presents a dilemma. A property 22 is not well served by numerous bright, energy-consuming lighting fixtures when a guest is not present. With the APA 12 present, lighting devices 17 can be controlled by the APA 12, and on a clock schedule that is typical, or is based upon the presence (detected or set) or preferences of the occupant in a room on the property 22.

Thus, data saved in the loyalty database record 41 for an individual may include preferred settings, preferred times, or simply recorded and analyzed historical, (typical) times and so forth. Meanwhile, through the voice recognition technology available through the listener 70, a user can speak to the APA 12 and change lighting to indicate presence. For example, a user may speak to the APA 12 and simply state, "please turn the lights off after nine in the morning" or "please leave the lights on because I am still present." The APA 12 may also include an occupancy sensor, which avoids the need for the user to explicitly state this fact.

Various other preferred settings may include settings for curtains, whether to be open, closed, or partially open. Likewise, curtains may include sheers as well as the light-proof or other types. Each may be desired to be set at a different location. Similarly, temperature of a room may vary with customer (guest) as well as with the time of day. In some locales, humidity is controlled by standards, but the desire for humidity does vary by user. It may be identified in a profile of a property 22, in guest records 41. In most instances, temperature is a personal choice, whereas humidity control may be done according to national standards for ventilation for the entire property 22.

Other attributes 109 in the database record 41 may include a cell phone number, email addresses, introduction dialogues or preferences for what those look like and what they include, Bluetooth pairing data, night light brightness settings, a preferred language for communicating with the APA 12, a preferred salutation, and so forth.

With respect to the devices 17 controlled by various room controls 78, these may be consolidated in a single room control 78 per device 17, or one affecting all devices 17. They may be connected in a network with the APA 12 as individual room controls 78 on each device 17a through 17d.

Settings may include sports teams followed, particular national channels or podcasts, various programs by name, time and weather services 42, may be accessed by the APA 12 from the user preferences database 40 containing the record 41 of the user. Similarly, other functions such as ground transportation credentials for rental car companies, trains, mass transit systems, and the like may be included.

In fact, third party information services 42 may include preferred common carriers in order that the APA 12 may be able to download those ground transportation credentials, the preferred providers, and obtain local schedules for controlling reminders or for direct presentation to a user.

Figure 5:
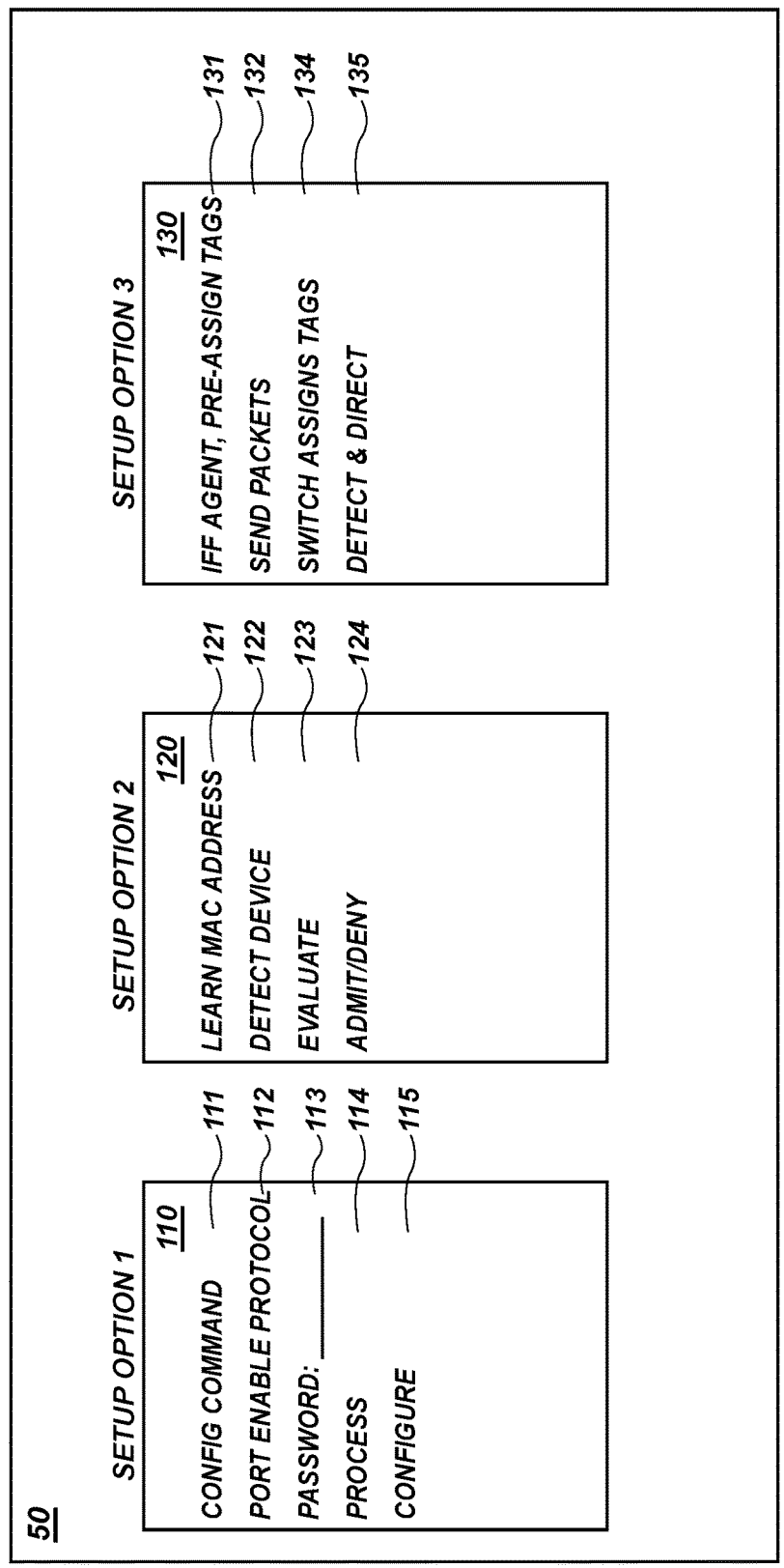
FIG. 5 is a schematic block diagram of various options for setting up an APA in accordance with the invention.

Referring to FIG. 5, if a device were permitted to connect to the Internet directly through an Ethernet port in a room, a user might simply plug in the correct cable and have uncontrolled access. This is unacceptable for the property. Various options shown in the illustration are mechanisms to defeat access to the internet by bypassing the APA 12.

All three options are available in commercial network switching equipment. The first option 110 is known as 802.1x port authentication. It involves the network switch requesting authentication credentials from the APA 12 in order to access the network. The config command 111 shows the switch port is configured by a network administrator according to the 802.1x protocol 112. Upon plug in, a device and switch negotiate access using the protocol 112. This entails the device providing access credentials 113, the network switch 12 processing 114 those credentials (e.g., password, etc.), and finally configuring the port 115 as enabled or disabled, according to the outcome of the processing 114.

Option two 120 may be thought of as mac authentication 120. The network switch learns 121 the mac address of the APA 12 connected to it. This information is part of the switch configuration. If another device other than APA 12 plugs into the port, the switch detects 122 that new device by its mac address and evaluates 123 (compares) it against the stored address. If not matched, the second device is rejected 124 (denied 124) from connecting. If matched, it is acted upon 124 by an acceptance 124 (admit 124).

Option three 130 involves VLAN tagging 130. The network port is configured to require all network packets to be tagged 131 with a particular 802.12 VLAN tag. When the port is configured, the administrator assigns 131 the tag, and the APA 12 has knowledge of it, thus being able direct 132 (send 132) packets to it in the required manner. If a device other than the APA 12 connects to the port, its network packets will lack the correct tag (identifier, 802.1q tag). Consequently, the switch will assign 134 a default tag. The switch passes on any correctly packets through, but assigns 134 a default tag to any untagged packet. That assignment 134 results in diversion 135 (detection and direction 135 to a VLAN identifier connected to nothing). This may be a dead line, data storage, or simply an unconnected line from whence such packets will not be retrieved. Thus, in various setups 110, 120, 130 prevent or resist bypassing of the APA 12 by other devices 17, 52 in a room on the property 22.

Figure 6:
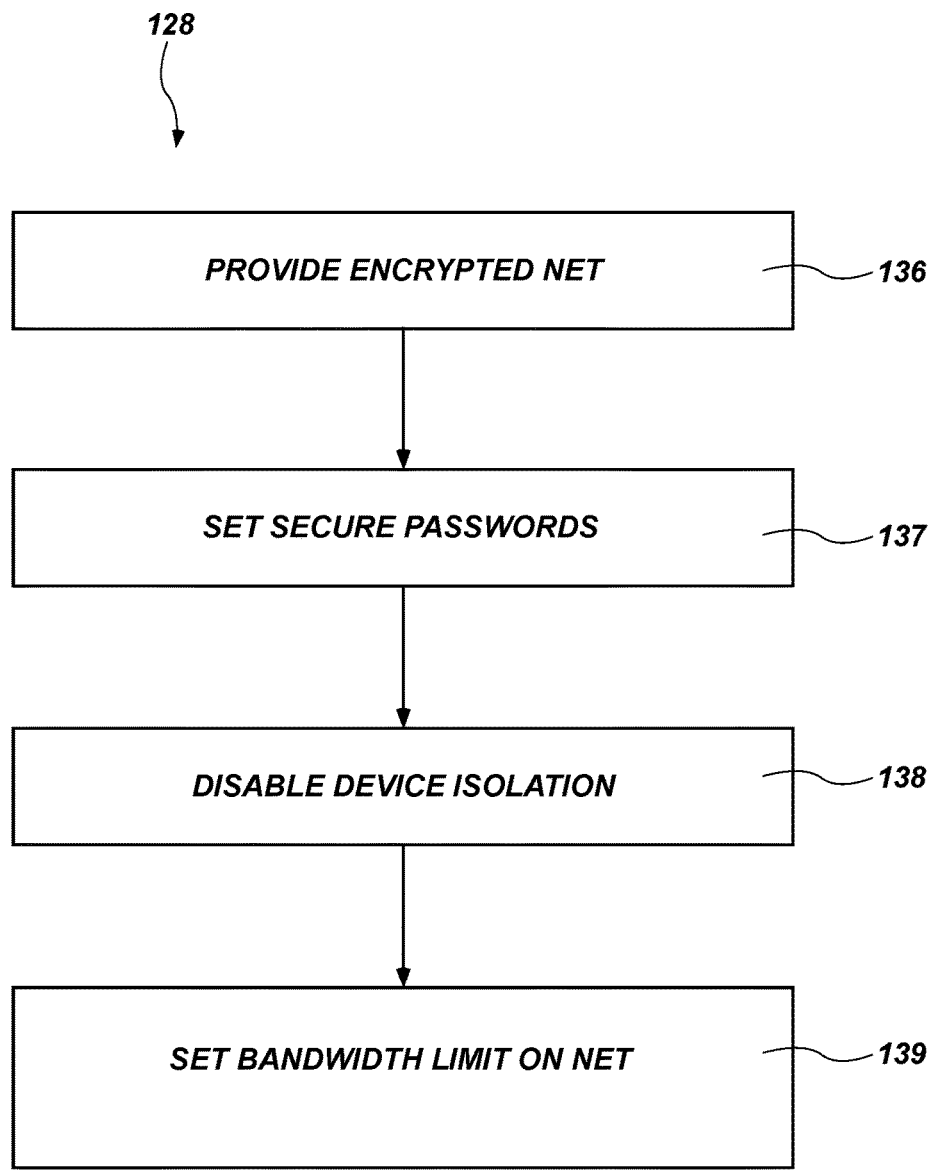
FIG. 6 is a schematic block diagram of a process for limiting bandwidth and maintaining security while disabling device isolation within a personal network of an individual user connected to a local area network through an APA.

Referring to FIG. 6, a process 128 is illustrated for implementing a limit on bandwidth through a private network 20. The APA 12 begins by creating 136 an encrypted network 20. The network 20 is encrypted by using the password 137 as the encryption key 137. It is a shared key 137 that participants in the network 20 all know and use to encrypt traffic and thus participate in the network 20.

Because all participants in the network 20 share knowledge of the encryption key 137, device isolation may be disabled 138, since no foreign, untrusted devices share the network 20. The APA 12 is acting as the access point 12 and gateway for traffic between the personal network 20 and LAN 50. As such, it is able to set a bandwidth limit on the traffic flow 139.

For example, in conventional networks, bandwidth users simply pass data packets at some rate. That rate may go in or out. Typically, downloading bandwidths are much greater than uploading bandwidths. Bandwidth in either direction through a network 50 may be overwhelming In a process 128 in accordance with the invention, the LAN 50 can assign bandwidth according to the request, the payment, a charge rate per data rate, or the like. By the APA 12 enforcing the bandwidth limit 139 and reporting that use, the LAN 50 does not find itself overwhelmed with excess data streams over which it has no control, and which may limit or prohibit access by certain guests as users at the property 22.

Not every APA 12 need operate with the same bandwidth limit. Rather, bandwidth limits may be assigned based on any criteria chosen including cost, priority, status of user, or the like.

Figure 7:
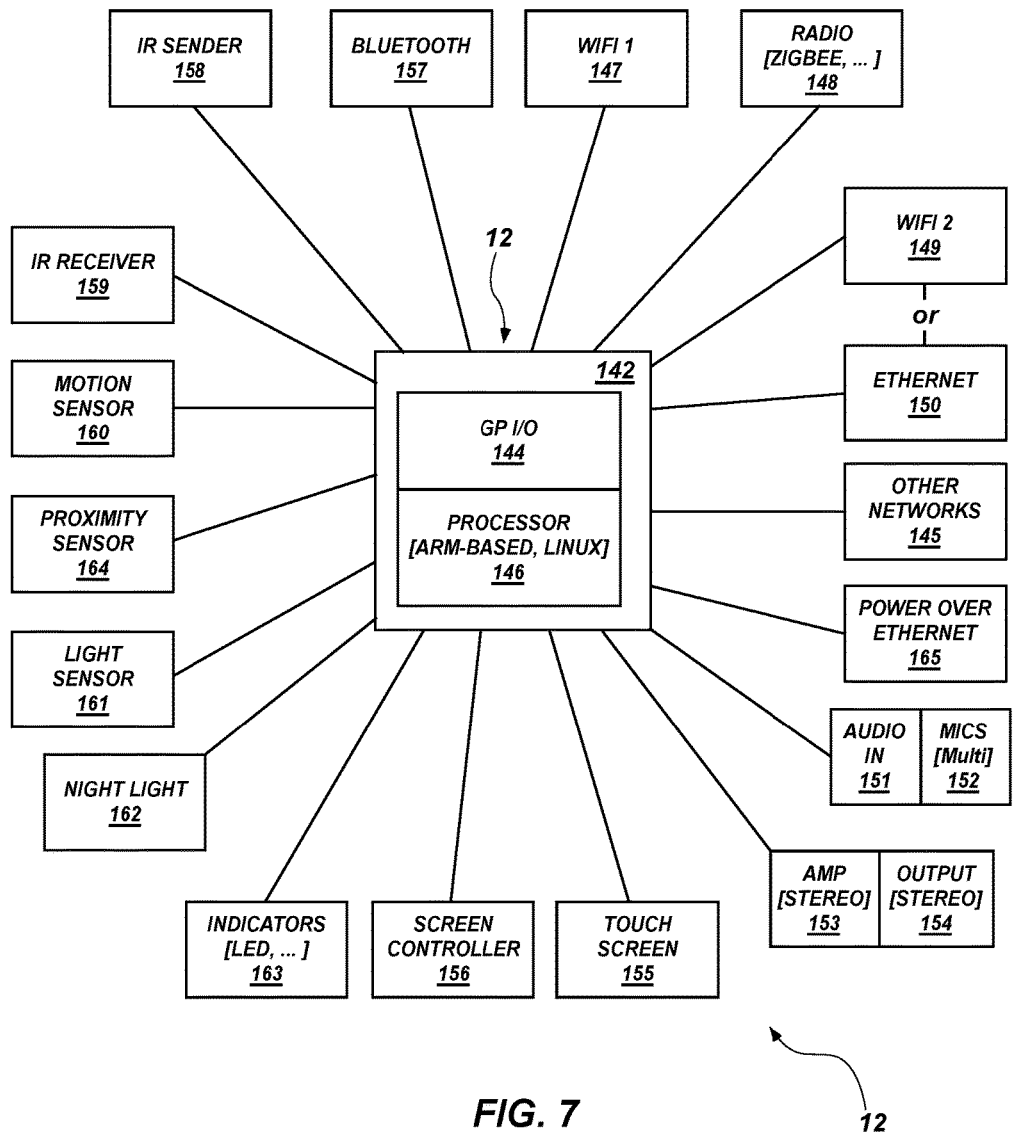
FIG. 7 is a schematic block diagram of a platform hosting a system in accordance with the invention, including various devices, all of which represent both hardware devices and software programmed into those devices, wherein some devices may be combined, but are typically individual as separate physical entities.

Referring to FIG. 7, while continuing to refer generally to FIGS. 1 through 16, various devices are illustrated. Each of the devices may also be thought of as a software executable (set of programming instructions from one to any number). Thus, in speaking of each item, with respect to FIG. 7, a system may mean a software program hosted on a processor, the processor so programmed, or both.

In general, a computer 142 or platform 142 may include a processor 146, such as a Linux based, or other O/S-based processor 146. That processor 146 may host a general purpose system 144. That is, some mechanical connection scheme may operate as a general purpose input and output device 144 accessing the processor 146. Together, the processor 146 and its general purpose I/O system 144 may constitute a computer 142 or microprocessor programmable and accessible by the devices 17, 52.

Accordingly, the platform 142 may be operably connected to a first WiFi system 147 (e.g., guest room WiFi 147 or guest WiFi 147) to form a private guest network. As a practical matter, such networks 147 are well understood in the art. One may think of the network 147 as all devices connected together to constitute it. On the other hand, it is a WiFi access point 147 that enables or creates such a network 147. Thus, one may call that device or the entire network the "WiFi system 147." For example, each device equipped with its own WiFi transceiver may then receive transmissions from a central WiFi transceiver 147 operating to effect a communication network 147 containing all participating devices.

Likewise, a radio 16 in the APA 12, such as a Zigbee radio 148 or the like, may be connected inside the APA 12 to facilitate a network 51 or room control network. In one example, this may constitute a mesh network containing (e.g., interconnecting) all room devices (e.g., devices 17, not guest devices 52) so equipped. In an alternative embodiment, this could be implemented by WiFi technology, Z-wave radio, Bluetooth low energy (BLE) radio, or the like as known in the art.

For example room devices such as lights, appliances, or any other device having a ZigBee radio or other transceiver may be part of a network 51 so enabled. Even devices such as the APA 12 and devices otherwise connected in some other network may be part of the network 51 through an organic (built in, on board) radio 16, 148.

Meanwhile, a second WiFi system 149 may also be used. This is because the APA 12 is a member of the network 50, but may be thought of as a hub 12 or switch 12 central to the network 20. A second WiFi system 149 or an Ethernet system 150 may facilitate participation by the platform 142 (e.g., hardware constituted in the APA 12, and executing software) in the LAN/WLAN network 50.

An audio input system 151 is connected to receive I/O signals as voice commands or communications from a user speaking to the APA 12. Likewise, a microphone 152, and typically multiple microphones 152 may be the actual receivers that detect or consume the sound produced by a person. The microphones 152 then pass on a signal as the audio input or supply the audio input signal. Microphones 152 are typically stereophonic in order to accommodate detection of distance, detection of direction, and accurate detection of sound.

Similarly, for outputs, a stereo output 154 may be provided from the platform 142, such as through speakers 154 driven by an amplifier 153. This may be monaural or stereo.

A touchscreen 155 operates as an input/output device for the platform 142 of the APA 12. In this way, a user may provide inputs by touching on menu items and may see selections by way of menus and the like.

A screen controller 156 may contain hardware, software, or both to provide commands to the touchscreen 155 and receive inputs therefrom in order to interface with the platform 42. In some embodiments this controller 156 may be integrated into the platform 142. Similarly, it may be integrated into the touch screen 155.

In addition, various indicators 163, such as light emitting diodes (LED) 163 and the like may be included on an outer case or housing of an APA 12. In many instances, it is simpler to push a single designated button than to process through several menus looking for common commands or commonly used commands In those instances, indicators 163 and associated buttons, therefore, may monitor the platform 142 and provide an ability to input a certain common commands without addressing a touchscreen 155 or other I/O device.

Various room devices 17 may be connected to the platform 142 by hard wiring or wireless connections over the room control network 51 (mesh 51). As a practical matter, cost and complexity militate for a wireless connection. Similarly, a light sensor 161 may detect a light turning on in a room on the property 22 in order to activate the platform 142 or have it stand by. Similarly, a motion sensor 160 or proximity sensor 164 may alert the platform 142. Typically both are active in the infrared range of radio frequencies to detect objects. Alternatively other signal frequencies including visible light, ultrasonic, and the like are also available.

In other embodiments, or as an alternative method, an infrared (IR) sender 158 may send communications to any device 17 capable of receiving an IR signal. For example, televisions, stereo audio systems, and other entertainment devices 17c may have IR-based remote controllers. These may be supplemented by the IR sender 158, which serves as an alternative sender 158 for IR control signals, these generated by the APA 12.

Similarly, an IR receiver 159 may facilitate receiving IR signals from any conventional remote controller. This is often called "signal capture." Thus, by receiving, decoding, interpreting, and otherwise processing signals from a conventional, dedicated IR-based remote controller, the IR receiver 159 may pass those signals on to the APA 12 for configuring instructions to the IR sender 158, for use as described hereinabove.

As an additional communication link, a Bluetooth system 157 may operate with the platform 142 in order to communicate with devices 17, 52 as needed. Again, one may speak of this system 157 as the point-to-point network of devices that it is. Alternatively, one may speak of a Bluetooth device 157, which is equipped with the hardware and software to communicate with one or more other Bluetooth devices 157.

Power may be supplied through a power source 165. This source 165 may be implemented by conventional means, such as line outlet power (e.g., 110 volt or other standard line voltage), a power supply (e.g., transformer and AC/DC converter) typically at low (5 to 15V) voltage, battery, or other source of current at a designated voltage. In one embodiment, power over Ethernet (POE) may be incorporated into the same socket (RJ45 type) that provides an Ethernet connection 150 for the platform 142.

In the platform 142 or computer 142 hosting the processor 146, the general purpose I/O system 144 may provide connections to many devices. For example, a power over Ethernet device 165 may provide comparatively low voltage and low power over Ethernet wire pairs dedicated to that purpose. This permits powering comparatively low-power-demand devices, such as communication links, processors, or the like directly over Ethernet wires without the need for separate power supplies.

Meanwhile, a proximity sensor 164 is substantially different from a motion sensor 160. As used herein, a motion sensor 160 may be any of several types that use radio frequency or other techniques to detect the presence of a person. Sonar, lasers, breaking light column connections, infrared detectors, or the like may all act as motion sensors 160. In contrast, a proximity sensor 164 operates to detect a distance from the device 164, in order to determine that a user has approached the proximity sensor 164 in order to interact therewith. For example, a motion sensor 160 may detect that a user has entered a room, and thereby activate the APA 12.

In contrast, a proximity sensor 164 may be embedded in a thermostat, a light switch, or the like. Upon detection by the proximity sensor 164 of a user in the near (for example, actionable, intended) region, then the proximity sensor 164 may signal any particular appliance 17b, or an entertainment center 16c, or environmental control 17a to activate a light, become visible, or otherwise become active and accessible for interaction by a user.

Similarly, microphones 152 may be multiple, and located in various locations around a room. Similarly, the indicators 163 may be configured as a light bar on any particular device 17, or on the APA 12 itself as the indicators 71.

Likewise, any hardware associated with WiFi2 149 or the Ethernet 150 will constitute the connection between the platform 142 of the APA 12 and the LAN/WLAN 50 operated on or by the property 22.

Figure 8:
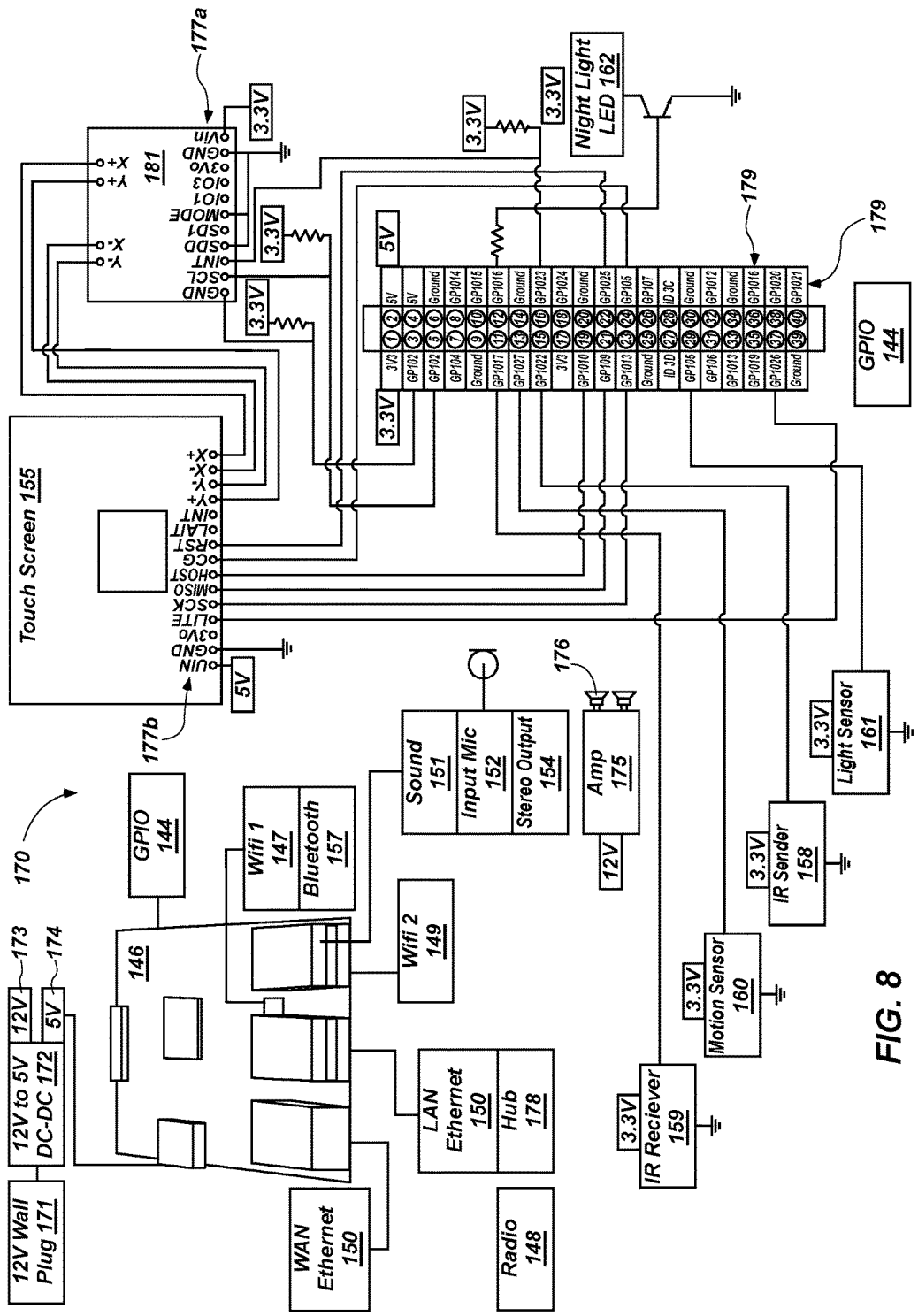
FIG. 8 is a schematic block diagram of one embodiment of an electrical schematic connection scheme for the devices in the platform of FIG. 7.

Referring to FIG. 8, while continuing to refer generally to FIGS. 1 through 16, a hardware platform 170 may be implemented in various configurations. However, one currently designed embodiment of a platform 170 operates to effect the platform 142 of FIG. 7. In this particular embodiment, a wall plug 171 may operate to convert, as a power supply, alternating current to direct current.

Typically, a step down from low voltage to twelve volts and five volts may occur to provide a twelve volt source 173 and a five volt source 174 from the converter 172. Again, as described hereinabove, a POE power source 165 may be implemented to provide power at an appropriate current and voltage over wires and pins so designated on an Ethernet plug and socket.

Meanwhile, the connections across a processor 146 or board 146 may rely on a general purpose I/O 144 as illustrated with the connections to the various components illustrated in FIG. 7. Examples include the first WiFi system 147 (guest network 20, 147), the second WiFi system 149 connecting to the wide area network 50, or the Ethernet 150, connecting to a WAN 50.

A sound system 151, an input microphone 152, a stereo output 154, and so forth may be connected. Similarly, a radio 148 (e.g., conventional radio for listening) may be operable to work with the system 170, by way of the in-room, device network 51. Similarly, various of the devices, such as indicators 163, sensors 161, and a touch controller 156 may connect to the GPIO 144 through an inter-integrated circuit (I2C™) type bus 166, or two-wire-interface (TWI) bus 166.

Meanwhile, multiple IR senders 158 and the IR receiver 159, as well as the motion sensor 160 (or several), a proximity sensor 164, and the light sensor 161 are connected through the general purpose I/O (GPIO) 144 having an array 179 or pins 179 for connection thereto. In the illustrated embodiment, the amplifier 175 may drive speakers 176 with the stereo output 154 from the sound system 151. Likewise, the connectors 177a and 177b connect the touchscreen 155 to the general purpose I/O 144 and to the board 181.

Figure 9:
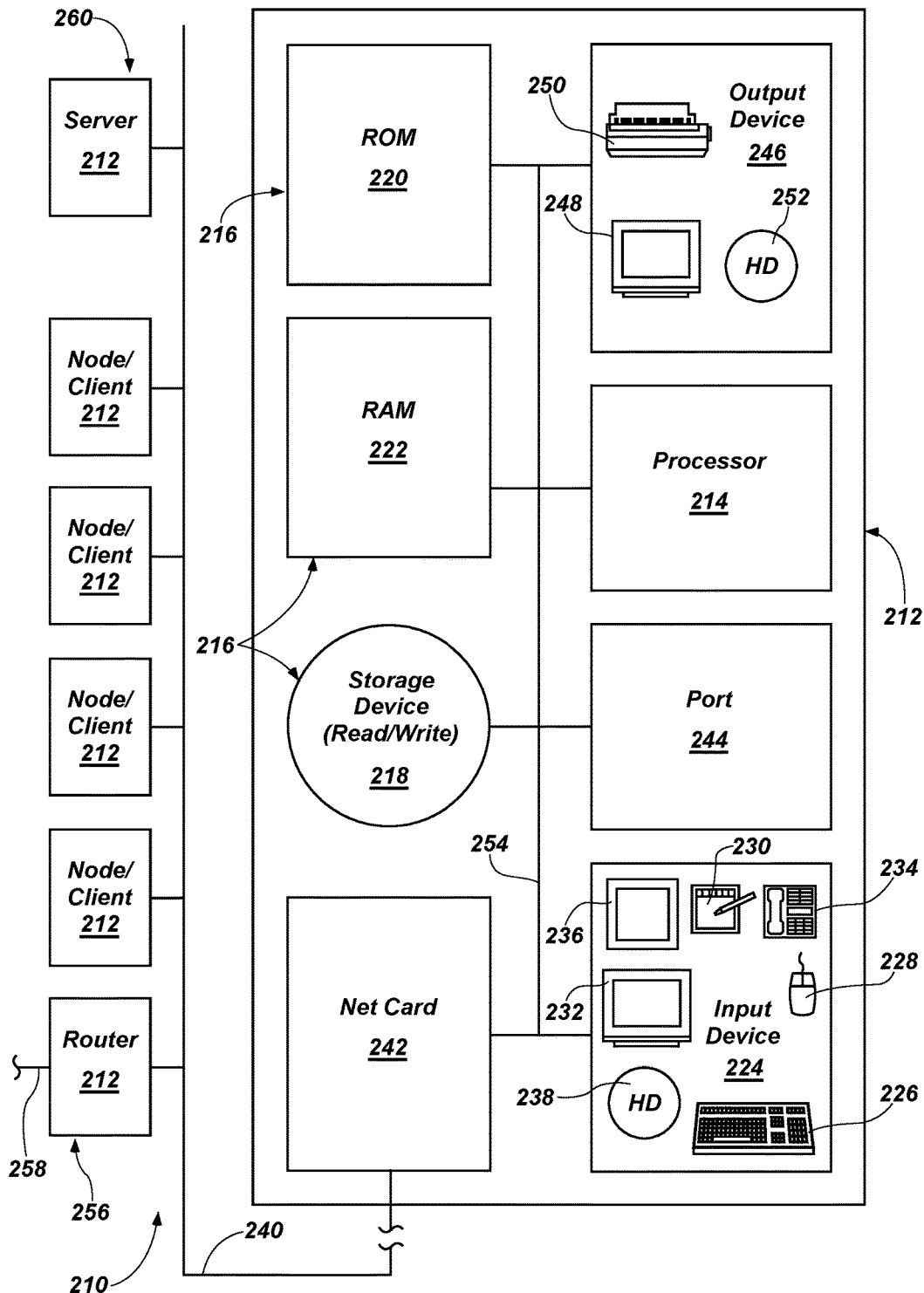
FIG. 9 is a schematic block diagram of a digital computer system, any part of which may be included (replicated) in any hardware device in the system, and includes a network connected to a router, and details the optional internal devices on any one of the nodes in the local network connected to the Internet through a router.

Referring to FIG. 9, a system in accordance with the invention may be implemented on a computer 212 or network 240, Internetwork 258, or all thereof. Although illustrated in a bus architecture, the computer may be implemented in any connectivity scheme and operating system protocol. Whether broadcast, polling, interrupt driven, neural network, or any other scheme, processing must fetch, decode, and execute instructions from a program.

The program may be hard wired, firmware, software, or the like. Likewise, the networks 240, 258 may be wired, wireless, peer-to-peer, mesh, client-server, or other alternatives.

For example, an apparatus 210 or system 210 for implementing the present invention may include one or more nodes 212 (e.g., client 212, computer 212). Such nodes 212 may contain a processor 214 or CPU 214. The CPU 214 may be operably connected to a memory device 216. A memory device 216 may include one or more devices such as a hard drive 218 or other non-volatile storage device 218, a read-only memory 220 (ROM 220), and a random access (and usually volatile) memory 222 (RAM 222 or operational memory 222). Such components 214, 216, 218, 220, 222 may exist in a single node 212 or may exist in multiple nodes 212 remote from one another.

In selected embodiments, the apparatus 210 may include an input device 224 for receiving inputs from a user or from another device. Input devices 224 may include one or more physical embodiments. For example, a keyboard 226 may be used for interaction with the user, as may a mouse 228 or stylus pad 230. A touch screen 232, a telephone 234, or simply a telecommunications line 234, may be used for communication with other devices, with a user, or the like. Similarly, a scanner 236 may be used to receive graphical inputs, which may or may not be translated to other formats. A hard drive 238 or other memory device 238 may be used as an input device whether resident within the particular node 212 or some other node 212 connected by a network 240. In selected embodiments, a network card 242 (interface card) or port 244 may be provided within a node 212 to facilitate communication through such a network 240.

In certain embodiments, an output device 216 may be provided within a node 212, or accessible within the apparatus 210. Output devices 216 may include one or more physical hardware units. For example, in general, a port 244 may be used to accept inputs into and send outputs from the node 212. Nevertheless, a monitor 248 may provide outputs to a user for feedback during a process, or for assisting two-way communication between the processor 214 and a user. A printer 250, a hard drive 252, or other device may be used for outputting information as output devices 246.

Internally, a bus 254, or plurality of buses 254, may operably interconnect the processor 214, memory devices 216, input devices 224, output devices 246, network card 242, and port 244. The bus 254 may be thought of as a data carrier. As such, the bus 254 may be embodied in numerous configurations. Wire, fiber optic line, wireless electromagnetic communications by visible light, infrared, and radio frequencies may likewise be implemented as appropriate for the bus 254 and the network 240.

In general, a network 240 to which a node 212 connects may, in turn, be connected through a router 256 to another network 258. In general, nodes 212 may be on the same network 240, adjoining networks (i.e., network 240 and neighboring network 258), or may be separated by multiple routers 256 and multiple networks as individual nodes 212 on an Internetwork. The individual nodes 212 may have various communication capabilities. In certain embodiments, a minimum of logical capability may be available in any node 212. For example, each node 212 may contain a processor 214 with more or less of the other components described hereinabove.

A network 240 may include one or more servers 260. Servers 260 may be used to manage, store, communicate, transfer, access, update, and the like, any practical number of files, databases, or the like for other nodes 212 on a network 240. Typically, a server 260 may be accessed by all nodes 212 on a network 240. Nevertheless, other special functions, including communications, applications, directory services, and the like, may be implemented by an individual server 260 or multiple servers 260.

In general, a node 212 may need to communicate over a network 240 with a server 260, a router 256, or other nodes 212. Similarly, a node 212 may need to communicate over another neighboring network 258 in an Internetwork connection with some remote node 212. Likewise, individual components may need to communicate data with one another. A communication link may exist, in general, between any pair of devices.

Figure 10:
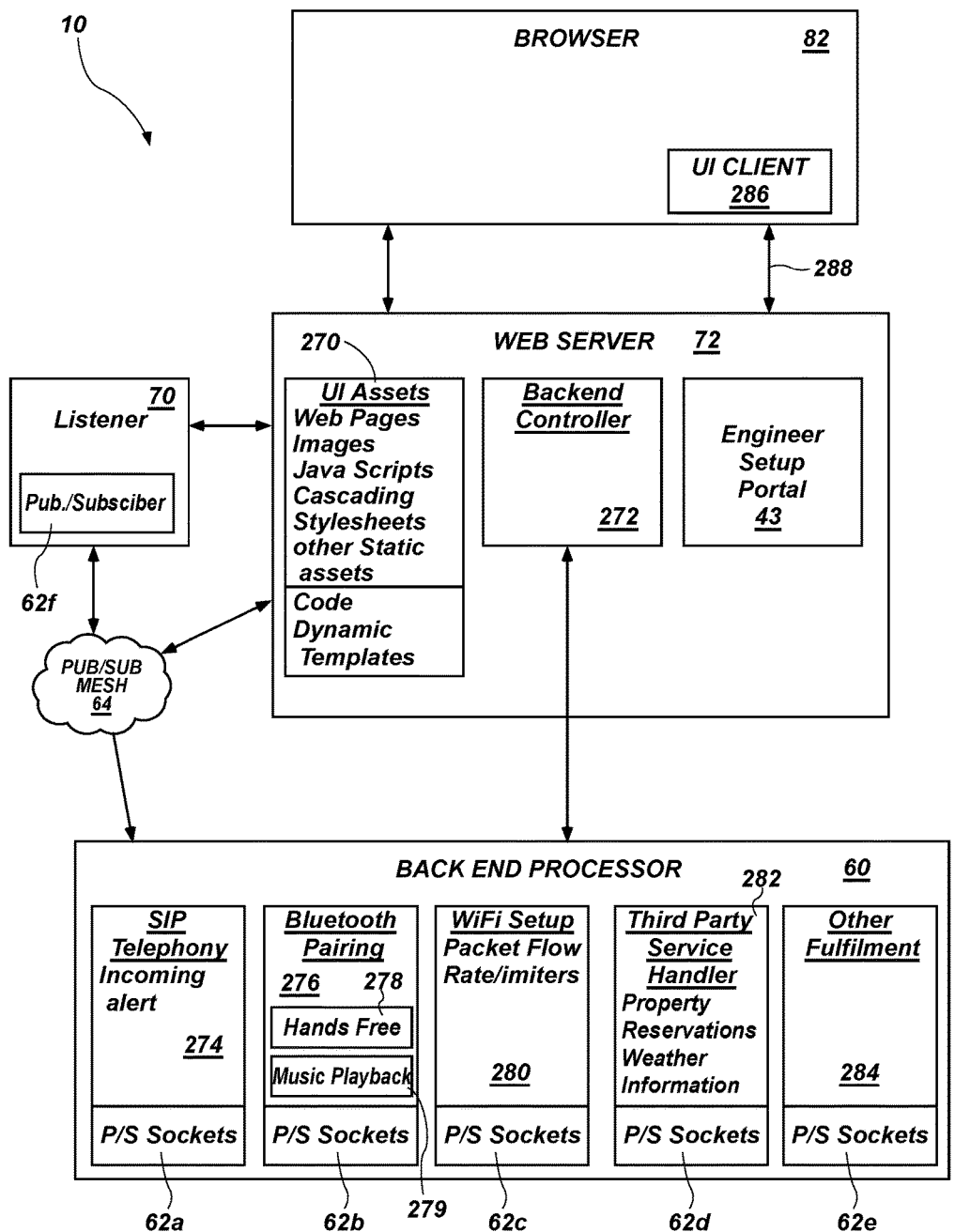
FIG. 10 is a schematic block diagram of a system for an access point assistant APA, illustrating various details of the browser, the web server, and the back end processor, as well as the listener.

Referring to FIG. 10, the system 10 is illustrated with particular detail to certain components thereof only. For example, the browser 82 is provided with a user interface client 286. For example, upon activating the browser 82, such as by touching a touchscreen 85c, pressing a key 85a, or button 85b, or otherwise interacting with the browser 82, the user interface client 286 may awake and engage other software processes in the browser 82. The user interface client 286 is actually downloaded from the web server 72 onto the browser 82. Thus, the user interface client 286 is a client of the web server 72.

One particularly useful function of the user interface client 286 is that it opens a web socket connection 288 to the web server 72. This capability now permits the web server 72 to send alerts over the web socket connection 288 to the browser 82. Thus, in contrast to conventional browsers, the browser 82 of the APA 12 maintains an open connection 288 in order to facilitate the need of the APA to react in response to messages served up by the web server 72 to the UI client 286 in the browser 82.

Content on the web server 72 includes user interface assets 270. For example, web pages, images, various templates, Java scripts or scripts in another language, and the like may be available for serving up by the web server 72. Similarly, style sheets, such as cascading style sheets with their inheritance properties available may also be stored under the umbrella of the user interface assets 270.

Other static assets may also be included. As a practical matter, the UI assets 270 may include code of various types. For example, dynamic templates that include code and data for serving up web pages and dialogue boxes, and the like may be included.

A backend controller 272 may include programs or executables written in code enabling it to respond to browser requests, messages, service requests, and the like. Accordingly, the backend controller 272 includes programming to receive inputs, including decision criteria some of which may exist within the backend controller 272 as standing data. Meanwhile, the backend controller 272 is able to process information according to criteria and data provided in order to perform a request for services.

As a practical matter, the web server 72 is typically not enabled to send out information without a browser request. However, as illustrated here, the web socket connection 288 provides an ability for the web server to communicate information to the user interface client 286 through the browser 82, unsolicited. One use, for example of this connection 288 is that once the browser 82 has opened the web socket connection 288, then the web server 72 may, for example, notify the user interface client 286, and thereby any other device or associated software module within the access point assistant 12 of an incoming phone call.

For example, otherwise, the SIP telephony module 274 may not be able to provide a user interface on the screen associated with the user interface client 286. Similarly, the web server 72 may be able to send a new screen in a timely fashion containing alerts, instructions, or identifying various requests for interaction presented to a user through the browser 82.

The engineer access portal 43 effectively operates as a website and enables an engineer to physically connect to the APA 12 and access a web server 72. Thus, the engineer may use a laptop or other computer particular to that engineer or programmer as the browser, processor, and the like to provide configuration of the APA 12. For example, an engineer may access the portal 43 and thereby configure the router 19, the radio 148 or other components within the APA 12.

The backend processor 60 may include a variety of devices or programs. These enable the web server 72 to handle requests from various devices and systems. For example, a SIP telephony system 274 may enable access to conventional telephones or any other telephone numbers. Similarly, a Bluetooth pairing system 276 may provide access to and communication with Blue tooth-enabled devices. Similarly, a WiFi system 280 may provide for set up and backup of information over the WiFi1 system 147.

A third party service handler 282 may provide communications with, and interactions with, third party information services 42. It may access the cloud through the Internet 18. Other fulfillment handlers 284 may provide similar functionality to access other services over the Internet 18.

The SIP telephony system 274 processes requests for telephony services. This is typically receiving incoming calls or placing outbound calls from the APA 12 to telephone numbers or any telephone network. Each of the systems 274, 276, 280, 282, 284 includes a pair of publication/subscription sockets 62a, 62b, 62c, 62d, 62e, respectively. These are sockets 62 as discussed hereinabove with respect to the operating system 58.

SIP telephony software 274 embodiments are available commercially and need not be discussed further herein. However, as a practical matter, the system 274 is responsible also to provide alerts of incoming calls, which can then be provided to the listener 70 through the publication/subscription mesh 64. Similarly, Blue tooth systems are ubiquitous and a software system 276 to implement the Blue tooth pairing function 276 may involve hands free executables 278 for managing traffic to and from hands free devices.

For example, in the APA 12, the system of microphones 66 and speakers 68 is a hands free system. For example, a personal device 52 of a guest, such as a smartphone 52b or a laptop computer 52a may be paired by the hands free executable 278 with the APA 12 such that the personal device 52a, 52b (in our instant example) relies on the APA 12 to provide hands free access to the device 52. Similarly, the APA 12 may also provide access to any other device 52d in a hands free executable 278.

Other audio may be handled by a playback executable 279. For example, music, entertainment, or other devices may be provided access through Blue tooth pairing system 276. That access then makes the APA 12 the interface for speaking commands or hearing outputs.

As a practical matter, if various devices 17 in the room are network aware, they might be connected similarly. However, there is no requirement on the devices 17 that they be "smart" as that term is normally interpreted to mean network aware or containing embedded processing. Typically, the devices 17 can be non-processing hardware devices.

Figure 16:
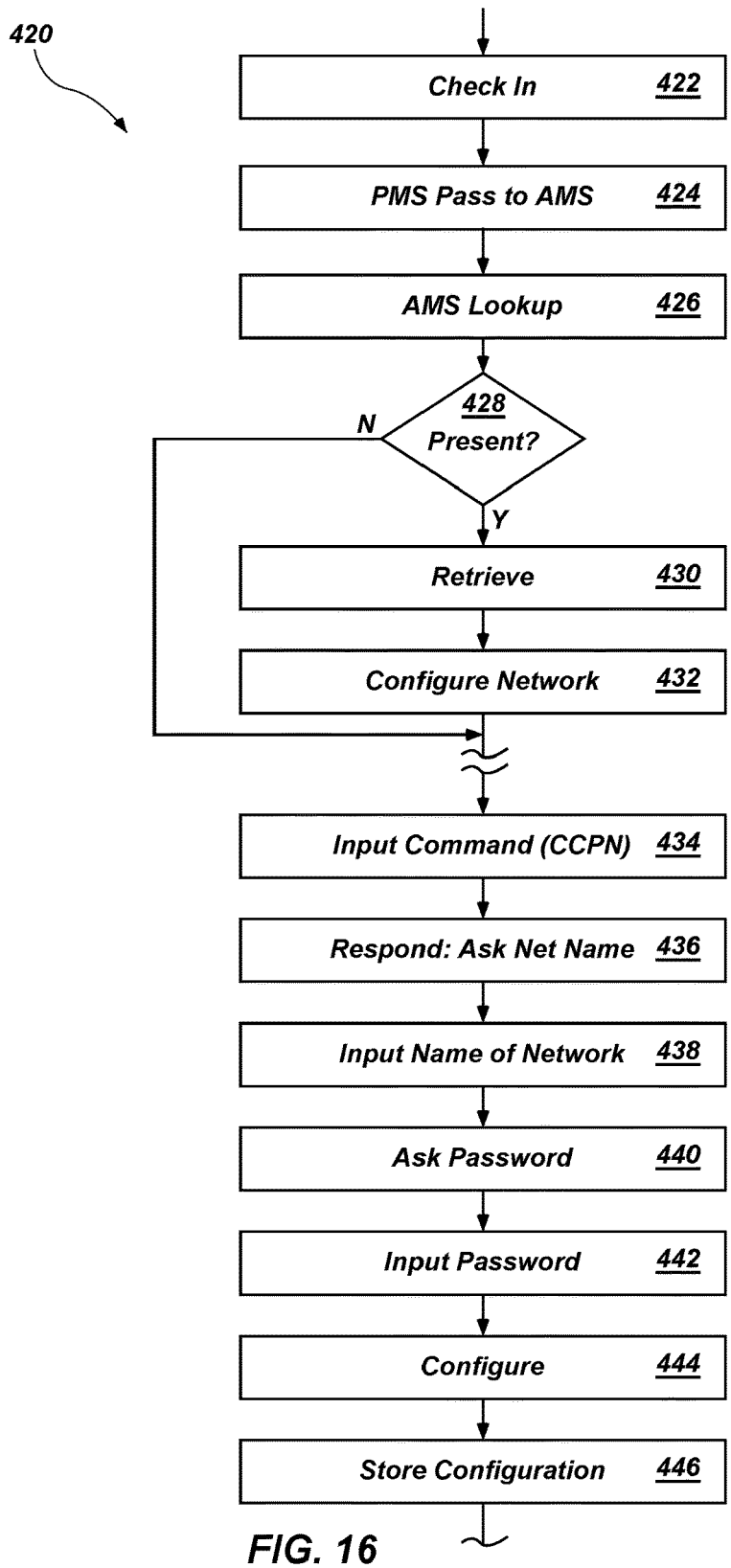
FIG. 16 is a schematic block diagram of executables and a process for activating an access point assistant by various modes, customized in accordance with a customer history of a guest at a property relying on access point assistants in accordance with the invention.

The purpose of the WiFi system 280 is to process commands pertaining to the WiFi1 147 device. Accordingly, set up, packet flow, bandwidth rate limiters, and the like may be programmed into the WiFi system 280. For example, the process 420 described hereinbelow with respect to FIG. 16 is one of the mechanisms serviced by the WiFi system 280.

Figure 12:
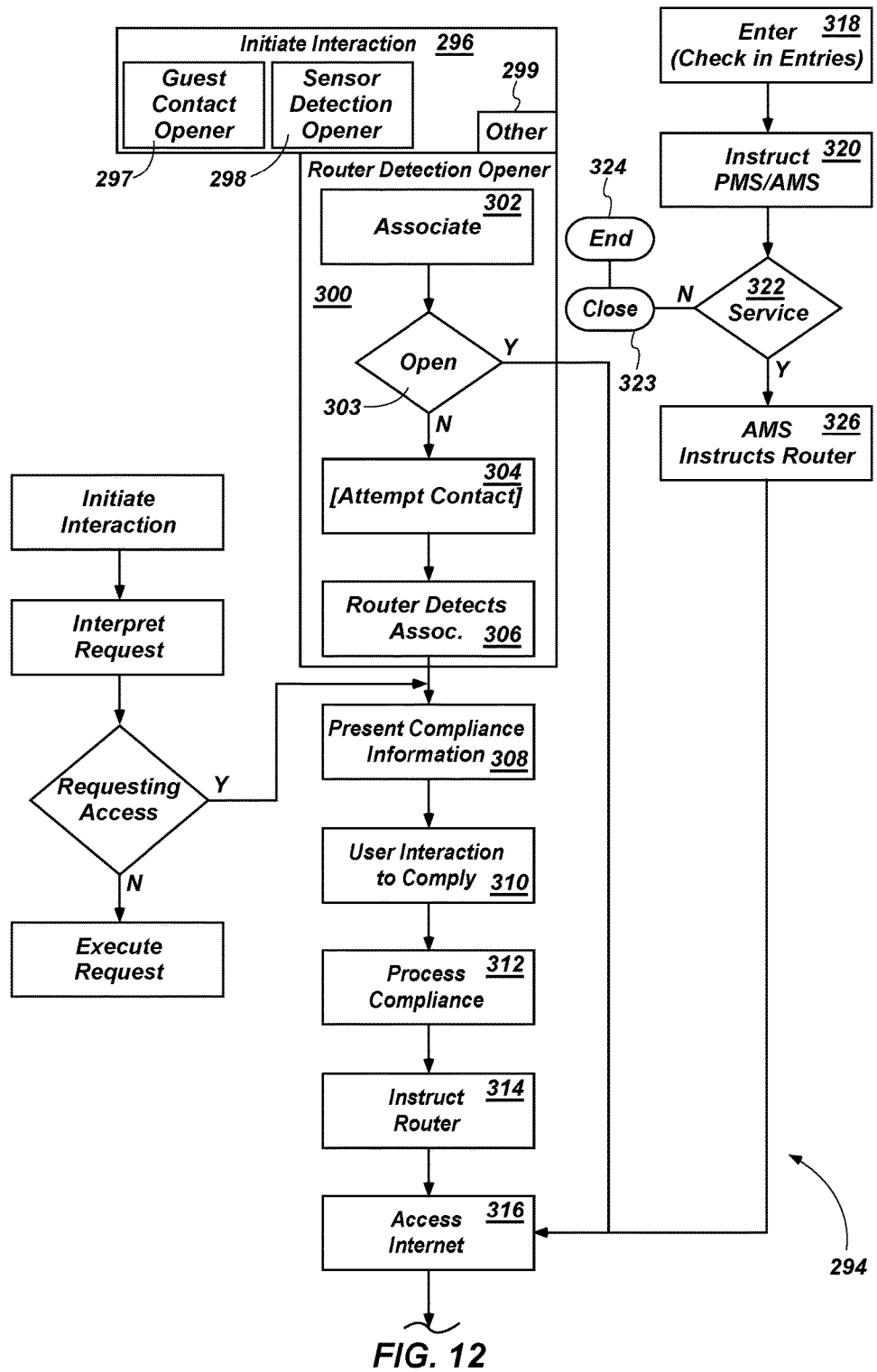
FIG. 12 is a schematic block diagram of a process and software executables for interacting between a user and the APA involving the processes of a listener.

Likewise, the systems 294 illustrated hereinbelow by FIG. 12 may be serviced by the WiFi system 280. That is, various functionalities may be implemented by the executables 280 or the WiFi system 280. In fact, in certain embodiments, the WiFi system 280 may be one embodiment of control executables 292 described hereinbelow with respect to FIG. 11.

In one sense, FIGS. 11 through 16 reflect implementations and algorithms by which the WiFi system 280 and other systems in the backend processor 60 operate. The third party service handler 282 is a system that services requests received from the listener 70 or browser 82 through the web server 72 and thereby arriving at the backend processor 60. Likewise, commands may go out from the backend processor 62 devices, systems, or the like in response to requests.

For example, the third party service handler 282 may manage communications to and from third party services 42. This includes information passing to and from those third party services 42. Protocols imposed by those third party services are handled by the third party services handler 282, in order to facilitate such communications.

Typically, these services may involve requests and responses with respect to services available from the property 22, including room service, room improvements, repairs, damage, or status of room systems, and the like reported by a guest. Similarly, information may be requested. Third parties outside the property 22 may provide reservations to restaurants or events as well.

Similarly, such services as weather, news, and the like may also be accessed by operation of the third party services handler 282. Virtually any of the service that is traditionally accessed by telephone or individual presence, including transportation by land, sea, or air may be accommodated by the third party services handler 282.

To the extent that services are made available over the world wide web or the Internet 18, other fulfillment engines 284 may provide programs accommodating the protocol requirements of those other fulfillment services. Accordingly, a user is no longer required to accommodate those unique protocols. Rather, the backend processor 60 accommodates them, and a human interface through microphones 66 and speakers 68, touchscreen, or the like processes those requests and their responses, via the same mechanism or another.

The publication/subscription mesh 64, is enabled by the various sockets 62 in the operation system 58. Accordingly, the listener 70 has its sockets 62f provided. Each of these sets of sockets 62 provides access to a publication/subscription mesh 64 as illustrated in FIG. 10. This effectively facilitates interlingual communication for messaging between any device connected through the socket system 62. Again, this is effectively a peer-to-many communication system. Individual devices and systems 70, 274, 276, 280, 282, 284 may all publish information. That information then pipelined or communicated to all those who subscribe to that information.

Referring to FIG. 11, a router 290 effectively operates to maintain an access table of devices allowed. It also redirects any non-allowed devices to a captive portal. The captive portal will typically be a web service somewhere across the Internet from the router. Thus, the router 290 may typically be unsecured for convenience, or may possibly be initially provided with a global password for all user's who are guests of the hotel. A new guest logs in and changes it to a personal password. Thus, the various access points 12 may form the hotel guest network 50 of access points connecting to the router. However, the router requires device isolation for security purposes. Otherwise, a router does not have individual port or device bandwidth control in a conventional system.

By lacking bandwidth control, herein, is meant that bandwidth cannot be assigned and controlled by guest or by device. Rather, the router 290 has some bandwidth control for the total traffic that may cross it between the hotel guest network and the Internet 18. One significant limitation to such a topology is that every device of an individual user (e.g., hotel guest, restaurant patron, Internet café customer, etc.) must log on to the Internet through the router going through all the protocols required to log on as a separate and independent device.

Moreover, multiple devices owned by a single user are all treated as individuals as if they each represented strangers to one another. One significance of this topology is that the router maintains an access table of devices allowed. Accordingly, when a new device owned by a user who is already registered at the room and guest name will still have to log on every single personal device.

Conventionally, a router 290 in association with another system might provide access without duplicate payment by maintaining a table of devices, such as room number, guest name, and the like. However, this does not obviate the problem of each device having to move through the entire login process, because, at the time of redirection, the router 290 does not know which room number, guest name, or the like to associate with a device. Therefore, the redirection takes place in order that the user provide that information so the system knows that the user need not pay again for the new device being connected. Moreover, again, no bandwidth control is provided by the router over individual devices or individual rooms sharing a connection.

Referring to FIG. 11, in a topology in accordance with the invention, the APA device 12 or APA 12 is provided with multiple interfaces. For example, a touchscreen provides access to a visual or touch user interface 84. Again, that visual or touch user interface 84 may be a service offsite, somewhere on the world wide web, located out in the cloud, or may be within the APA device 12, or the hotel network system 50. Here, the hotel network 50 represents not only the network, but the central controller. That controller may be a wireless network controller, an Ethernet switch, a DSL network controller over phone wires, or the like. Thus, the visual or touch user interface may be located at any of those hardware positions.

Another user interface is a voice user interface. That voice user interface is accessed by a user communicating with the APA device 12 through microphones and speakers. Typically, the voice user interface is located in the cloud, because it demands substantial processing.

As described hereinabove, the APA 12 may connect to the hotel network 50 by means of an Ethernet connection, WiFi connection, or other network connections. Meanwhile, part of the function or router function provided by the APA 12 is an access point that then allows all guest devices to connect as a recognized, permitted or allowed devices once any of them has connected to the APA 12.

For example, the individual guest devices can connect to the access point, and thereby obtain access to the APA device 12. However, they will soon quickly learn that they do not, at that point, have Internet access. However, all are on the private or personal network 20 and can communicate with one another.

Meanwhile, the router function or the router software hosted on the APA device 12 provides the brokering of access to the Internet 18 by the individual guest devices 52. In one way of speaking, the access point embedded within the APA 12 with a WiFi2 radio 149 or other network connection and WiFi1 device connection provides unconditional packet switching. It need not rely on a table that would normally be maintained by a router 256 (a router 256 is any router; in an APA 12 a router 290 is an instance of a router 290).

Since each of the guest devices 52 will have access to the personal password of the user who owns each of them, which password has been programmed to be the password of the APA 12, all guest devices 52 may access the APA 12 as an access point unconditionally.

In contrast, in a regular hotel guest network access point, a router 256 must maintain a table of allowed devices in order to provide an ability to control access to the Internet 18. Meanwhile, a conventional hotel router 256 must maintain an association of name and room number with the devices that have been logged on by one same individual. Again, each device still must be independently logged on through the entire login protocol.

Moreover, in order for a hotel router 256 to maintain security, any user logging on to the hotel guest network access point must identify itself by name and room number. Then the router 256 must then include complex software and data in order to conduct a verification that assures that the device attempting to connect to the hotel guest network 210 is indeed associated with the room number and guest name alleged. In contrast, the APA device 12 and its router 19, 290 is thus accessible to all the individual guest's devices 52 in an apparatus in accordance with the invention, with a single password, which password is itself authentication, being not generally known and being unique to the owner of the guest devices 52.

Referring to FIG. 11, while continuing to refer generally to FIGS. 1 through 16, a version of a system 10 is illustrated. The Internet 18 represents not only the Internet network itself, but the other devices 26 through 46 operating in the cloud to cooperate with the APA 12.

In the illustrated embodiment, the property network 50 is connected by a secure link 291 to the WiFi2 device 149, an Ethernet 150, or another network connection 145. Any one or all of such devices 145, 149, 150 may link to the property network 50 in order to implement the functionality of the APA 12.

As a practical matter, in one contemplated embodiment, the router 290 may actually be physically present as hardware 290 within the access point assistant 12. In an alternative embodiment, the router 290 may actually be separate, distinct, or even remote from the access point assistant 12, but is nevertheless dedicated to and under the exclusive control of the APA 12.

In the illustrated embodiment, a user 289 may interact with the access point assistant 12 by any suitable means. For example, a keyboard 226, mouse 228, writing pad 230, or the like may be present. On the other hand, a simple touchscreen 85c, 155, 232 may be present. Similarly, a microphone 66 may pick up a voice command from a user 289 which may be processed as described hereinabove. Thus, by any or all such devices, the APA 12 provides an interface 84 with a user 289.

The microphone 66 and speakers 68 provide an alternative interface 84, which may actually serve as an exclusively used interface 84 relied upon by a user 289. The presence of the natural language understanding (NLU) system 28, voice recognition system 26 speech-to-text system 26, text-to-speech engine 30, and the like may be engaged in the cloud in order to process voice interactions from the user 289, and back to the user 289.

The microphone 66, speakers 68, touchscreen 85c, and other suitable devices and associated processing software, may together constitute the user interface 84. Thus, the presence of keys 85a, buttons 85b, the touchscreen 85c, and the like may all be available. Nevertheless, as a convenience, the microphone 66 and speakers 68 offload the need for tactile elements of an interface 84 with the APA 12 by a user 289.

The presence of secure connections 291, exemplified by one instance 291a with the property network 50 through the WiFi2 device 149, as well as the secure connection 291b connecting a guest device 52 in the personal network 20 with the WiFi1 device 147, are controlled by their router 290. An important function of the router 290 is to control all packet traffic between all of the interfaces 145, 147, 149, 150.

In accordance with the controls implemented by the APA 12, the router 290 will control the data flow, total data passage, data rates (bandwidth), and the like. Accordingly, the router 290 prevents access to the Internet 18 by guest devices 52 that are not managed through the APA 12. The APA 12 operates as an enabler for the personal network 20 to exist by connecting the guest devices 52 through the router 290. It also operates as a limiting APA 12 acting for the property in controlling access to the Internet 18. The APA devices simply connect to the network 20. Abuse is remedied by policies concerning the operation of the APA provided by the management system. Processes executing on the APA 12 provide a mechanism and algorithm for such control asserted by the APA 12.

Thus, the APA 12 operates as a unique device providing certain controls uniquely under the authority of the user 289, and other controls uniquely under the authority of the management system. Referring to FIG. 12, an Internet-access process 294 (IAP 294) is illustrated. This process 294 or method 294 may begin by initiating 296 an interaction. The initiation 296 of interaction with the APA 12 may be done by a guest contact opener 297 in which the user 289 may speak or otherwise interact with the user interface 84 of the APA 12. For example, a guest contact opener 297 may execute based upon a user 289 speaking into the microphone 66, and requesting to initiate 296 an interaction.

Alternatively, an individual sensor 160, 161, 164, may effectively detect 298 or open 298 an interaction with a user 289. In another alternative, a sensor 160, 161, 164 may detect the presence of a user 289, or otherwise detect occupancy in a room. A signal reflecting (signifying) that detection may thereby execute the opener 298 by speaking to a user 289 through the speakers 68. The APA 12 inquiring or soliciting a request from a user 289 is done through the listener 70 and its speakers 68 or speaker outputs 68. In an alternative embodiment, some other 299 interface, in hardware, software, or both may be responsible to initiate 296 an interaction with a user 289.

In one currently contemplated embodiment, a router detection opener 300 may operate to initiate 296 interaction with a user 289. In this system 300, the router 290 may detect a guest device 52 attempting to connect to the router 290. A user 289 will typically recognize that initiation 296 or router detection opener 300 therein as the guest device 52 presenting the names of various networks available to join, including the router 290. Upon selection by a user 289 on the guest device 52 of the router 290, the router 290 then executes a router detection opener 300 corresponding to "associating" 302 by the device 52 with the router 290.

Likewise, once a guest device 52 has been associated 302 with the router 290, that device 52 may attempt to send a packet to the Internet 18. Accordingly, the router 290 will execute its router detection opener 300 in response to an attempt 304 to contact the router 290 or Internet 18.

A test 303 determines whether the association 302 exists. That is, whether Internet access is enabled or not. That is, a device associates with the private network 20. A test 303 determines whether Internet access has been enabled for that associated device. The system then, depending on enablement, may advance the process 294 to access 316 the Internet 18.

However, if the test 303 reports the connection as disabled, then an attempt 304 to contact the Internet 18 will be detected 306. The detection 306 by the router 290 effectively includes detecting "association" 302, and an attempt 304 at contact with the Internet 18.

Rather than simply declaring an error or the unavailability of the Internet 18 (as in conventional systems), the detection 306 results in an affirmative series of actions to provide access by the APA 12 and the guest devices 52 to the Internet 18. Thus, the steps 302, 304, 306 represent the router detection opener 300 serving as the initiating 296 of interaction.

Next, the APA 12 presents 308 compliance information. Compliance information may include, for example, various codes, keys, or other information and mechanisms by which to authorize access to the Internet 18. These may include any passwords, may include payment plans, may require proof of subscription to some level of service from a low bandwidth free service up to some ultra high bandwidth premium service, or the like. Accordingly, the compliance information presented 308 will effectively contain some combination of information, codes, requests for authorization, payment plans, access to payment portals, or the like required to obtain authorization for access to the Internet 18.

A user 289 may then provide interactions 310 through a guest device 52, or directly through the access point assistant 12 in order to interact 310 in compliance with the authorization steps. This may involve transfer to a payment portal by which to input data from a credit card for billing, accessing the front desk at the property 22 to add a charge to a room invoice, or simply providing a particular password for some lower level access provided free.

On the one hand, this is a mechanism by which to provide hardware and software controlling access to the Internet 18. It is also an opportunity for a user 289 to affirmatively select the level of service, and thereby obtain through loyalty points or loyalty VIP status or the like, upgraded service, or to affirmatively choose to use only a free service, or some other level of service.

The ability to provide 308 information, specifically including the compliance information, may also be an opportunity to present marketing information encouraging upgrades with their upcharges. Thus, the property 22 or the owner's thereof have the opportunity to advertise as well as assist. Since the best advertising informs the customer, presenting 308 options may be an important ability for the property 22.

Ultimately, the APA 12 processes 312 the compliance information and instructs 314 the router 290 in accordance with the authorizations processed 312. Accessing 316 the Internet 18 may then be conducted by any of the guest devices 52 through the router 290.

In an alternative approach, upon check in by a user 289, a user or a clerk at the property 22 may enter 318 information corresponding to a user 289. For example, reservation information may be input or may be read from a database upon entry of a user number such as a guest loyalty number. The property management system 14, 36 may then instruct 320 the APA management system 34 to provide access.

For example, instructing 320 will typically involve the property management system 14, 36 instructing the APA management system 34 with settings for room devices 17 or other data known about the guest 289. Data may include a name, loyalty number, room assignment, VIP status or other loyalty level of service, or the like. These will typically be known from a loyalty database 38 accessible by the property management system 36, and the AMS 34.

Thus, instructing 320 of the AMS 34 then provides the ability to test 322 the loyalty status, service level status, or the like. If the test 322 results in a denial or a failure of the test 322 to provide advanced loyalty perquisites, then the system may close 323 the instruction 320, and end 324 the process. At that point, the APA 12 will typically rely on the original initiating 296 by one of the other mechanisms 297, 298, 299, 300 in order to access 316 the Internet 18.

If the loyalty or perquisite level is sufficiently high to result in an affirmative answer to the test 322, the APA management system 34 may instruct 326 the router 290 to provide access automatically. This then effectively bypasses any need for the initiation 296 of interaction between a user 289 and the APA 12. Thereafter, any guest device 52 may simply log on. The router 290 should then already know the passwords and other configuration information for the private network 20 and the guest devices 52.

In some embodiments, or in some situations, the guest 289 may rate or qualify for a higher level of service or access 316 to the Internet 18, but the configuration information may not be in the system. Accordingly, there may still be some required interaction 296 by the user 289. However, as a practical matter, loyalty databases 38, will typically include all known parameters authorized by a user 289. So, the instruction 326 may proceed directly to accessing 316 the Internet 18 by the router 290. Typically this will include automatic connection of guest devices 52 as soon as they are awakened and attempt to select the router 290 as their network connection to the APA 12.

Figure 13:
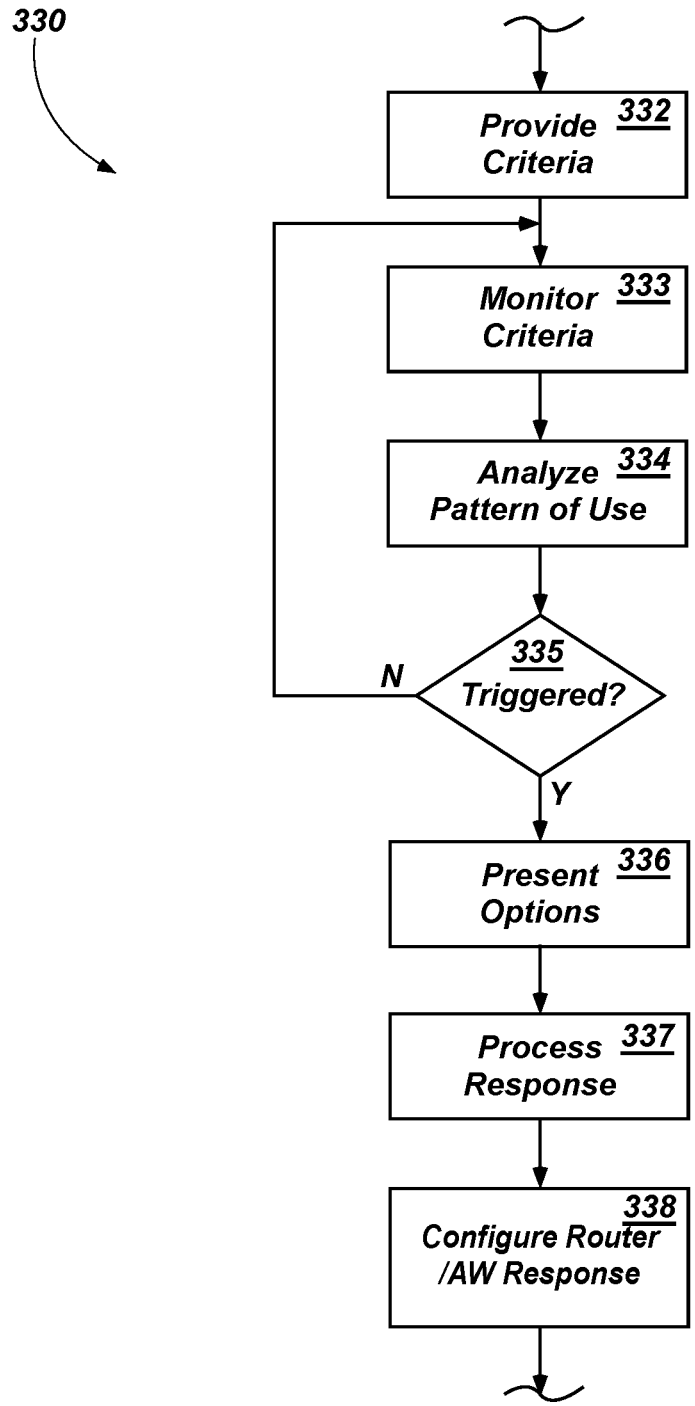
FIG. 13 is a schematic block diagram of a process and executables for analyzing patterns of use in order to present options and process responses of a user interacting with an APA.

Referring to FIG. 13, an Internet notification process (INP) 330 is illustrated. In the illustrated embodiment, an individual employed by installer of APAs 12 may determine criteria for controlling the APA 12. Such an individual is typically an engineer or programmer representing the seller or provider of the APA 12. Thus, the owner of the property 22 is not typically the entity or person responsible.

Moreover, the individual user of an APA 12 in a guest room is likewise not the user of the portal 43. Rather, an engineer responsible for managing the APA's 12, and supporting them in operation may be responsible for providing 332 criteria that will be used in monitoring 333 and analyzing 334 patterns of use by an individual user (guest) 289.

One purpose for the criteria provided 332 is to notify a user 289 if service is likely to be interrupted, downloads may be buffered, or various use limits are about to be exceeded, at some inconvenience to the user 289. Thus, it is important to determine algorithmically what is happening through any individual APA 12.

For example, a threshold limit may be identified for any parameter of use, such as bandwidth, total data usage, or the like. Moreover, there may be a determination made as to what statistics may be monitored 333 and used for an analysis 334 of the pattern of use of a user 289. For example, artificial intelligence systems, curve fits, modeling (numerical methods modeling, curve fitting, equation solving, interpolations, extrapolations, etc.) histories with statistical analysis thereof, and the like may be identified as criteria to be provided 332.

Criteria may be selected and values (limits, triggers, thresholds, margins) may be assigned in providing 332 monitoring criteria. Likewise, sources of data, ongoing bandwidth or cyclical bandwidth use patterns as related to a particular time of day, a particular source, or the like may be identified. Similarly, the frequency of access may vary by day, by hour, or by website visited. Moreover, usage may have a continuous nature, or may be discontinuous. It may be repeatable or predictable based on a frequency of use, a timing during a day, a duration, or the like.

An important reason to provide 332 criteria for controlling monitoring 333 and analysis 334 will be the test 335. For example, overuse of bandwidth, or approaching a bandwidth rate that will exceed a free or a first level of subscription may just incur a warning to a user that bandwidth limits will soon be exceeded and will need to be upgraded to avoid slow service, content buffering or the like.

On the other hand, like a speed warning provided by a modern automobile, it may be aggravating to a user to have that warning repeated too frequently. Thus, how often to present an option to upgrade service, what time span or duration has been contracted by a data purchase, as well as how to present proper notification with a minimum of interruption may also be built into the criteria provided 332. Whether looking at data volume, which room devices are being used, which online third party services 42 may be used, or the like may all be figured into the criteria provided 332.

A processor 214 inside an APA 12 may conduct monitoring 333 of the criteria provided 332 as directed through the AMS (management system). For example, the APA 12 becomes a remote agent enforcing the criteria provided 332 by the mechanism of the processor 214 in the APA 12. The APA 12 may report back and identify to the AMS information regarding the monitoring 333 and analysis 334 according to the criteria provided 332.

Depending on what those criteria are, the test 335 may trigger the need to provide an unsolicited reminder or warning to a user. Once any criterion has caused a triggering 335 of the test 335, then the APA 12 may present 336 an array of information, options, or both to the user by any suitable output device. Those options may include reducing demands sent by the APA 12 to the LAN/WLAN 50.

Heretofore, a demand on a LAN/WLAN 50 in a conventional topology might exceed its bandwidth, without being able to determine what devices connected through various access ports were responsible for the over consumption of bandwidth. Accordingly, a packet traffic jam occurs in the LAN/WLAN 50, such as in a hub, switch, or the like with no ability to control it. In an apparatus and method in accordance with the invention, the APA 12 does its own monitoring 333, analysis 334, and control according to criteria provided 332. Thus, the AMS may assign to the APA 12 a bandwidth or data limit and the APA 12 enforces it.

Thus, upon presenting 336 various options to a user, the APA 12 may use voice through a speaker, presentation on a monitor or display screen 86, flashing indicators 71, or other mechanism to warn. In fact, the APA 12 may actually provide warnings by all those mechanisms, permitting a higher chance of the user recognizing the warning and responding.

A user may respond and the APA 12 will process 337 the response selected by a user. The user may provide a response to be processed 337 by an upgrade, presentation of a dialogue box and options, presentation of an authorization form to authorize an upgrade or upcharge for additional or extended service, or the like. In accordance with the processing 337 of the response of a user, the router 290 within the APA 12 may then be configured 338 in accordance with the response process 337.

For example, in one presently contemplated embodiment, the control executables 292 within the access point assistant 12 may operate to send the new configuration data 338 to the router 290. Accordingly, the router 290 is thereby reconfigured 338 by virtue of the received inputs controlling configuration.

A substantial benefit provided by a process 330 or INP 330 is that the user may have a comparatively seamless experience in working through the APA 12 on the personal network 20. For example, the monitoring 333 and analysis 334 allow for an unsolicited output of the test 335 presenting 336 options to upgrade, improve, or to change behavior.

For example, a user streaming movies may want to simply click a button on a display screen 86 or touchscreen 85c and have the movie continue. In other environments, a user may simply choose to log off of a particular third party information service 42 that is streaming excessive amounts of data for the bandwidth contracted with the property 22 for the APA 12. Thus, whether a change of behavior or a change of configuration is required, a user has the option presented 336, unsolicited, in order to not bring the process or experience underway to a halt unnecessarily.

As a practical matter, unsolicited need not mean intrusive. Criteria for presentation may be provided 332 to indicate a soft notification, or a more blatant or harsh notification. A user may actually determine how they want to be reminded in a notification. Nevertheless, by providing the monitoring 333 and analysis 334, a user's experience may be more seamless. This may be by user control, by virtue of the information available to the user 289, in a timely manner to allow better control of the experience over the personal network 20.

To a certain extent, personal devices 52 do not typically permit advertising, messages, or other communications unsolicited. If the situation were otherwise, an individual walking down the sidewalk of a city street holding a smartphone would be barraged by unsolicited advertising from the WiFi hotspot in every business passed.

In a system 10 in accordance with the invention, the user permits, intentionally, through the configuration of the APA 12, a user 289 (e.g., guest 289, etc.) has devices 52. No outside system is permitted access to those devices 52. Even the APA 12 cannot push unsolicited information to the devices 52 in the personal network 20. However, the APA 12 is itself an interface 84 or has a user interface 84, at some degree of operation, all to itself 12. In other words, as illustrated in FIG. 11, the APA 12 has the devices 66, 68, 84 and executables 292 required for a guest 289 to interface with the APA 12 itself.

Thus, a user may control the router 290 effectively at will. In the illustrated embodiment of FIG. 11, the router 290 and the APA 12 need not be located in the same physical piece of hardware, either in the same frame, rack, or processor 214. That is, each may be configured in its own separate hardware. On the other hand, they may also be programmed into the same hardware.

All that is required to implement the INP process 330 of FIG. 13 is a user interface to which an individual user has access to a user interface 84 in the APA 12, but does not actually own or control the APA 12 entirely. Rather, the APA 12 is part of the guest room and part of the property 22. Accordingly, the APA 12 can within itself perform the monitoring 333 and analysis 334 required, and push 336 or present 336, to display on itself, the appropriate options and configurations 338 required thereby.

Otherwise, in a prior art network of any type, guest devices 52 are typically isolated (e.g., device isolation security), and no other network is permitted the access to those devices 52. Here, an intermediate access point assistant 12 can assert certain controls over itself, and conduct monitoring.

By having the user interfaces 84, such as those represented by the microphone 66, speakers 68, touchscreen 85c, and so forth in the access point assistant 12, the actual controls for configuration of the router 290 exist in the room, and are accessible to the individual user. For example, the router 290 may be in the same box, and even hosted on the same processor 214 as the access point assistant 12. Nevertheless, the router 290 may be located elsewhere, including in the basement of the property 22.

Regardless, an important factor to consider here is that the presence of the APA 12 in the room itself enables the unsolicited warnings and seamless changes in configuration for a user. In contrast, prior art systems do not provide an APA 12 with its own built in user interface 84 in the room. Moreover, there is no dedicated router 290 known in the prior art corresponding to the access point assistant 12.

Referring to FIGS. 14A through 14E, in certain embodiments of an apparatus and method in accordance with the invention, a listener 70 when viewed as a processor 70 or a process 70 may include various executable threads. For example, a microphone handler 340 is responsible to provide management over the microphone 66 in the APA 12. Accordingly, the microphone handler 340 may pass communications 341, 343 to the voice recognition handler 342. The voice recognition handler 342 is responsible for interacting with the voice engine 27, and in particular the voice recognition system 26, the natural language unit 28, and the text-to-speech engine 30. Accordingly, the voice recognition handler 342 may provide communications 345 to an output queue 344. The output queue 344 is an engine 344 for maintaining a stack or queue as a sequence of audio output items to be output by the speakers 68 of the APA 12.

Similarly, a publication/subscription mesh handler 346 will also provide outputs 347 to the queue 344. Each of these systems 340, 342, 344, 346 will be described in further detail in the order of the figures.

Figure 14A:
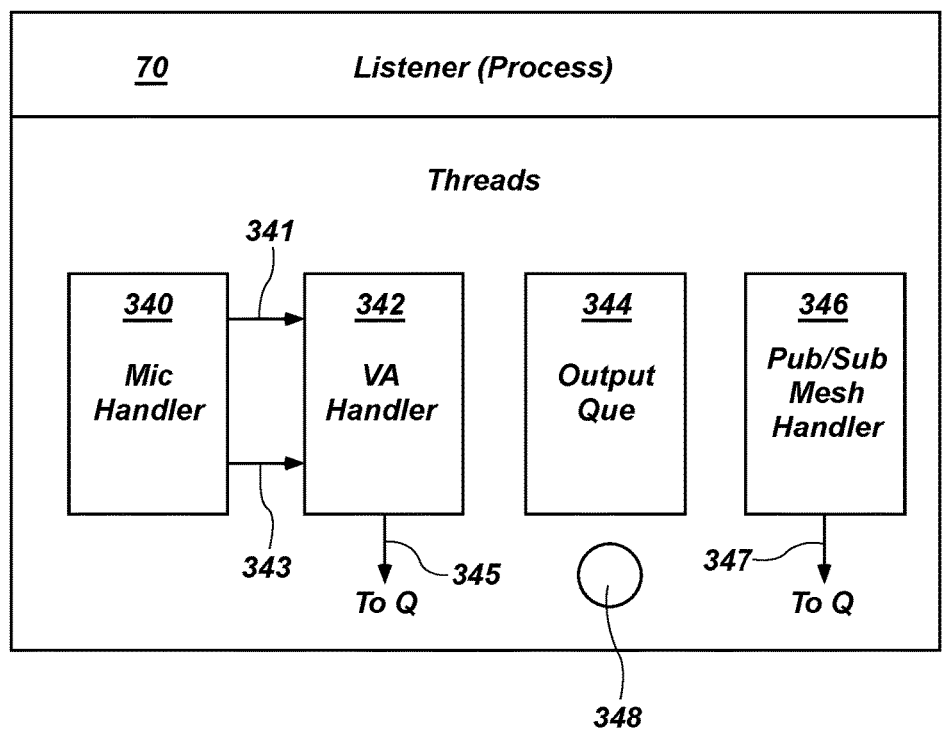
FIGS. 14A through 14E represent a schematic block diagram of a voice recognition system and process including a microphone handler, voice recognition handler, publication/subscription mesh handler, and queue output process all associated with a listener system in accordance with the invention.
Figure 14B:
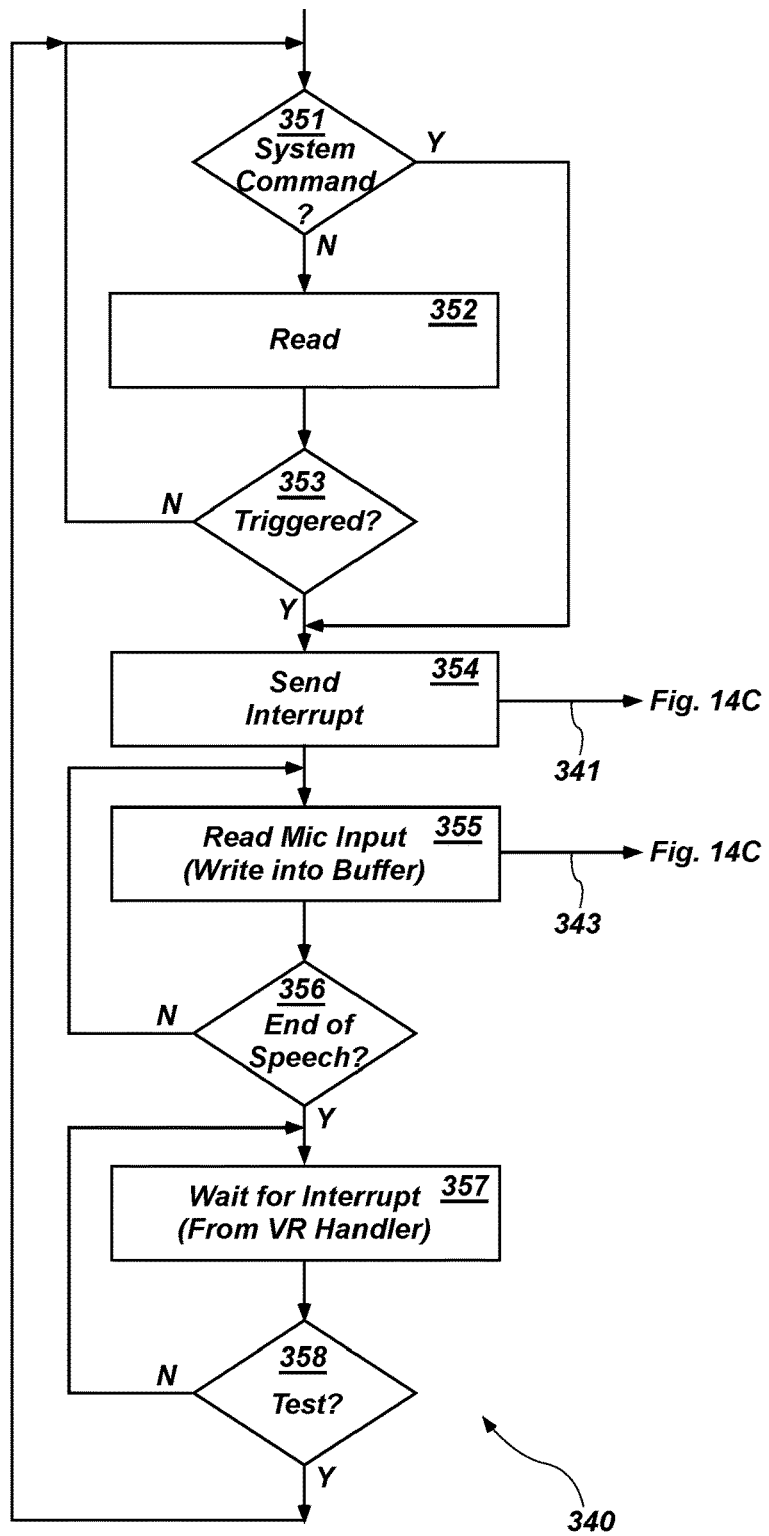

FIG. 14B illustrates one embodiment of the microphone handler 340. In the illustrated embodiment, the test 351 effectively determines whether the microphone handler 340 has yet been tasked to listen for a system command. If not, then the handler 340 reads 352 the audio stream and tests 353 whether it represents a trigger (e.g., pre-programmed trigger phrase). If not, the handler 340 continues to read 352 any inputs received.

Once the information read 352 is identified by the test 353 as representing a trigger, an interrupt is sent 354 to the voice recognition handler 342. Meanwhile, if the microphone handler 340 had previously been triggered and was therefore listening for a system command in subsequent audio, then that system command will be recognized by the test 351 and forwarded to send 354 and interrupt in accordance therewith.

At this point, the microphone handler 340 begins reading 355 the microphone inputs received from the microphone 66, and will effectively forward them or write them to a buffer 350 in the voice recognition handler 342. As a practical matter, the buffer 350 is shared between the microphone handler 340 and the voice recognition handler 342 and can physically reside in memory space (e.g., such as memory 216, etc.) allocated to either one.

After the reading 355, a test 356 determines, based on an algorithmic analysis of the audio stream resulting, whether the end of speech has occurred. If it has not, the process 340 continues to read 355 until the test 356 results in an affirmative response that the end of speech has indeed occurred. Typically, various algorithms exist that provide a recognition for the end of speech.

For example, pauses of greater than a certain length, certain interpretation of inflections, certain keywords, and the like may be detected just as voice triggers are detected by the test 353. Voice activity detection (VAD) 356 may provide the test 356. For example, metrics such as short term energy of the speech signal, or a zero crossing rate. These mechanisms are described in the literature of voice recognition and may be programmed independently, or used from publicly available software systems.

Once the end of speech has been recognized by the test 356, the microphone handler 340 waits 357 for an interrupt expected to be received from the voice recognition handler 342. The interrupt received 357 or awaited 357 represents a signal that the VR handler 342 has completed processing of all previously submitted audio that has been read 355 and buffered 350. Therefore, the microphone handler 340 may begin processing the next comment, command, or other coherent segment of audio signal.

Once the interrupt has arrived, the test 358 determines that an affirmative response to the test 358 has occurred, the interrupt has been received 357, the signal has been understood, and the process 340 returns to continue reading 351 or reading and testing 351.

Figure 14C:
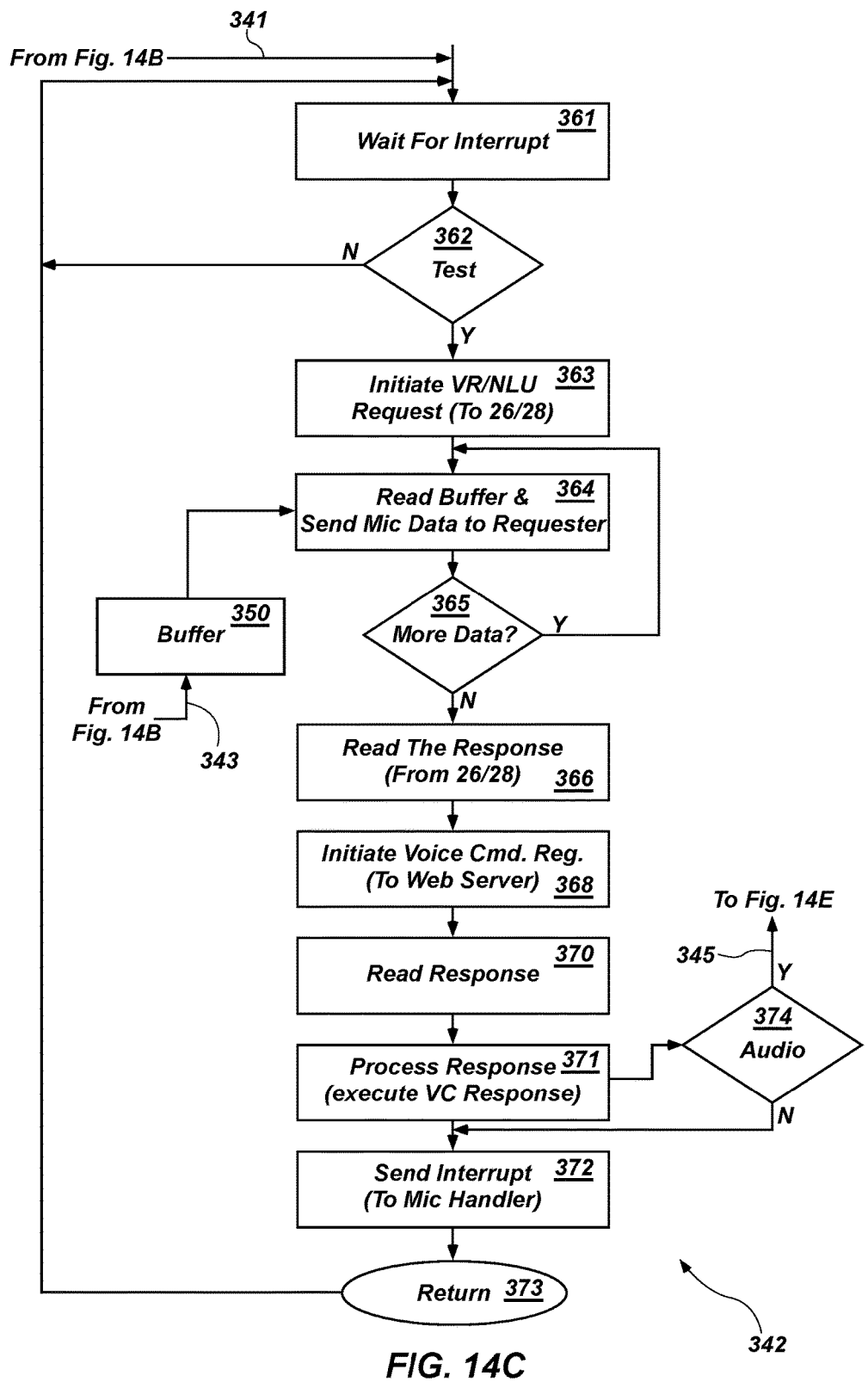

Referring to FIG. 14C, while continuing to refer to FIGS. 14A through 14E, as well as FIGS. 1 through 16 generally, a voice recognition handler 342 may begin by waiting 361 for an interrupt expected to be sent 354 from the microphone handler 340. The interrupt sent 354 represents the start of a new voice processing request. Accordingly, the test 362 amounts to recognition of the receipt of the interrupt sent 354, and the progress of the voice recognition handler 342 operating to initiate 363 the voice engine 27. This particularly means the voice recognition engine 26 and the natural language unit 28. Thus, successful passage of the test 362 results in initiating 363 the request resulting in reading 364 (on behalf of the requester, and therefore sending the content back to the requester) from the buffer 350 the microphone data received from the microphone handler 340.

Data continues to be sent continuously until the test 365 results in a negative response. That is, so long as more data is available, the test 365 results in repeating the reading 364 of the buffer 350. When no more information is available, or more data, the test 365 advances the process 342 to reading 366 the response.

The response is read 366 from the voice engine 27, as an output from the natural language understanding unit 28. Effectively, reading 366 involves receiving back an actionable command. This is represented by the communication from the NLU 28 back to the listener 70 in FIG. 2. Initiating 368 the voice command request amounts to sending by the voice recognition handler 342 a request to the web server 72, and receiving back a response by the web server.

The command initiated 368 is an instruction to the web server 72, resulting in action by the web server 72 and a response 370 sent back to the voice recognition handler 342. That response 370 is then processed 371. Processing 371 effectively results in execution of the response such as an actionable command Part of that response read 370 and processed 371 may involve an audio output.

The test 374 determines whether the response involves audio. If so, then a command corresponding to that signal is passed by the voice recognition handler 342 into the queue 348. The actual data for the queue output process 344 may be contained in a queue 348 embodied in some type of memory location accessible by the system 344.

The processing 371 interprets or executes the response, and the VRH 342 sends 372, unconditionally, an interrupt to the microphone handler 340. The process 342 or system 342 then returns 373 control of the process 342 back to waiting 361 for an interrupt from the microphone handler 340.

Figure 14D:
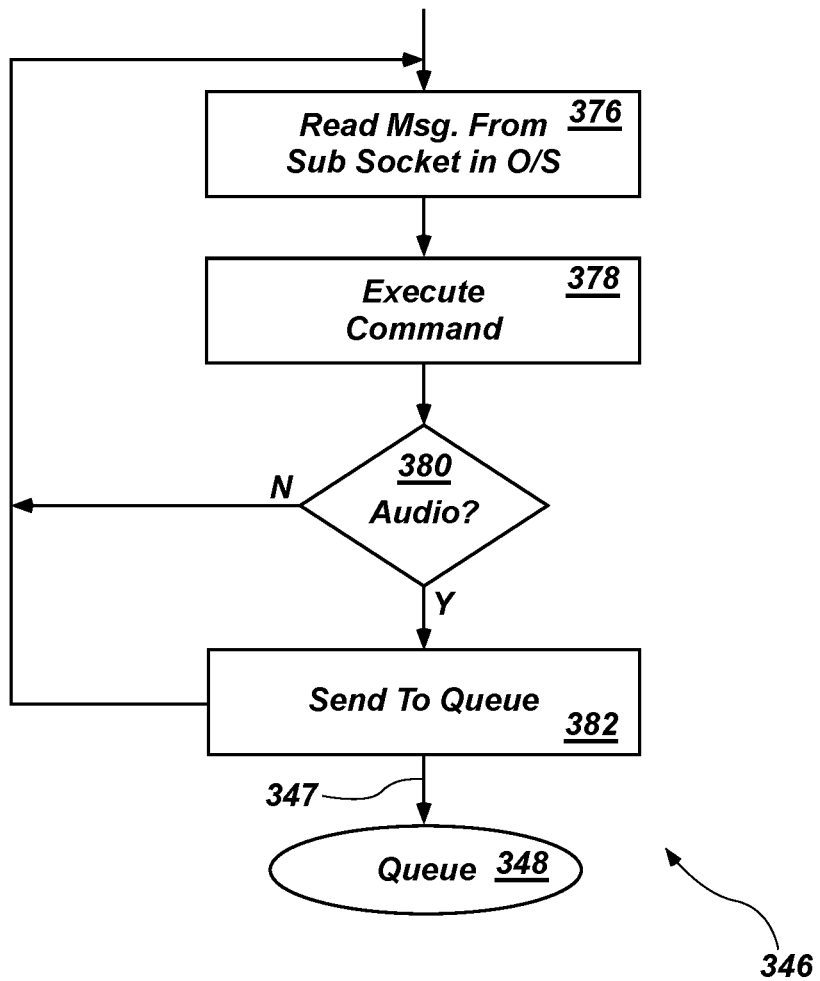

Referring to FIG. 14D, while continuing to refer specifically to FIGS. 14A through 14E as well as FIGS. 1 through 16 generally, the publication/subscription mesh handler (PSMH) 346 begins by reading 376 messages received from subscription sockets 62 in the operating system 58. These messages may be sent by other components within the systems 10, 12 desiring or needing to communicate with the audio output through the speakers 68.

As a practical matter, any device or process in communication with the publication/subscription mesh 64 may be at liberty to send a message to be read 376 by the PSMH 346. Accordingly, the PSMH 346 will execute 378 the command received. A test 380 merely determines whether the request is for audio services or not. If not, the PSMH 346 returns to reading 376 incoming messages in the subscription socket 62.

If, on the other hand, the test 380 reveals that the command executed 378 requires services of speakers 68 or audio signals, then the PSMH 346 sends 382 to the queue output process (QOP) 344, or directly to the queue 348 in memory that audio signal.

Figure 14E:
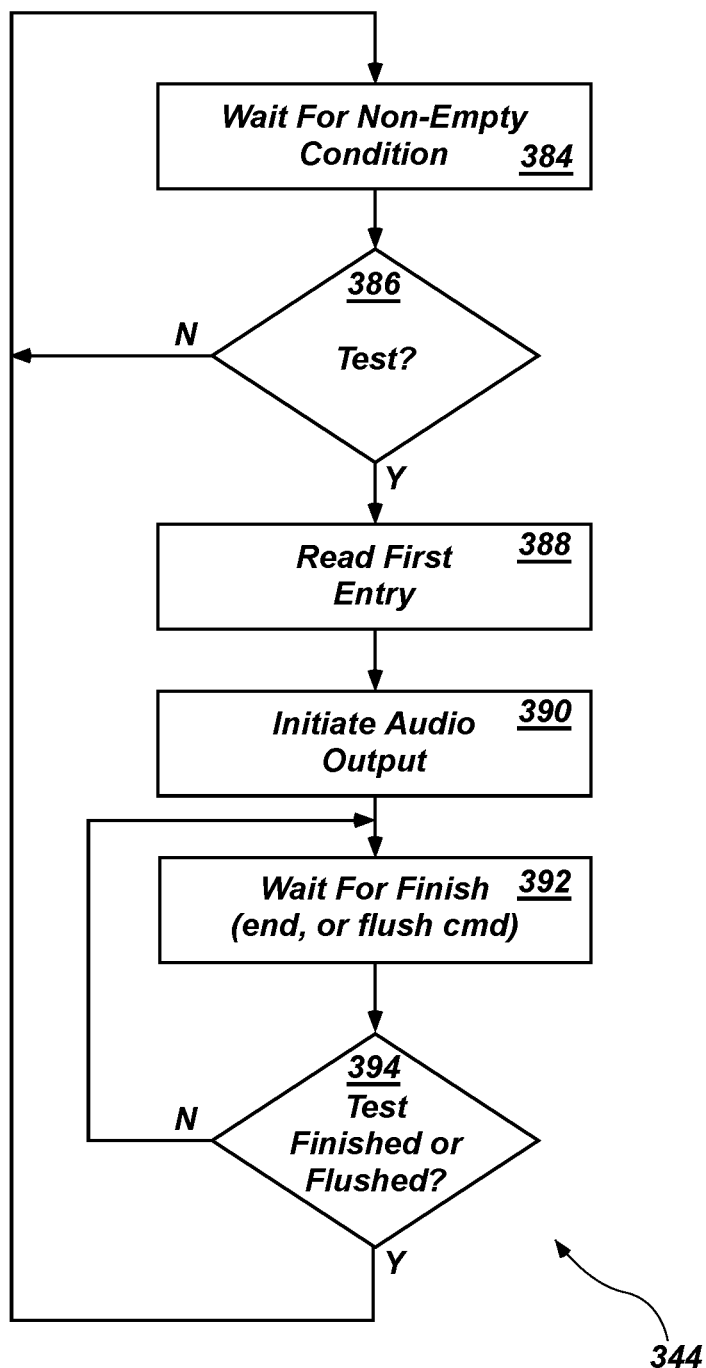

Referring to FIG. 14E, while continuing to refer generally to FIGS. 1 through 16, a queue output process 344 may begin with waiting 384 for a non-empty condition to occur in the queue 348. A test 386 determines logically whether the non-empty condition has occurred. If it has not, then waiting 384 continues. If the queue 348 is not empty, then the test 386 passes control of the process 344 to reading 388 the first entry, and subsequent entries or files.

Upon initiating 390 the audio output to the speakers 68, the QOP 344 waits 392 for an indication that the audio output has finished. Typically, this may come by an end of data in the buffer 350. The test 394 determines if the audio has finished. If not, then the QOP 344 continues to wait 392 until an affirmative output of the test 394 indicates that all data has been output by the speakers 68, and emptied from the buffers 350 in accordance therewith.

Reading 388 is followed by initiating 390 an audio output. Meanwhile, the process 344 will wait 392 as long as audio output continues according to an algorithm that tests the nature, weight, shape, delays, and other physical characteristics that may be determined to indicate the end of an audio output file. Waiting 293 continues as testing 394 determines whether the end of the audio output file has arrived. If not, then waiting 392 continues as output 390 continues.

The test 394, when the result is affirmative, meaning that the audio output file has finished, returns the process 344 back to the waiting 384 for a non-empty condition. One may see that if multiple files are present, then a file may be read, a non-empty condition is still detected, and each entry is read 388 in order until finished as per the test 394.

Figure 15A:
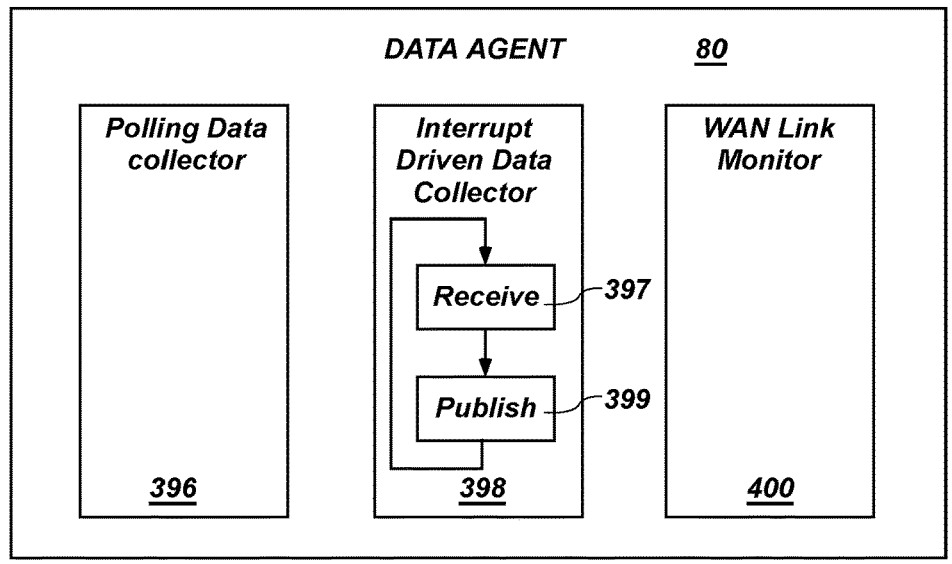
FIG. 15A is a schematic block diagram of the data agent in a system in accordance with the invention.
Figure 15B:
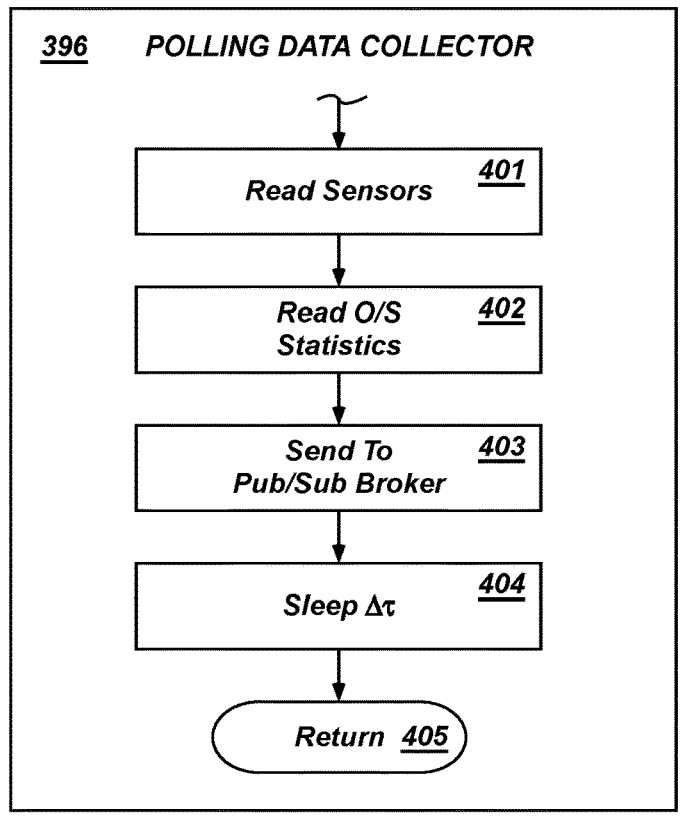
FIG. 15B is a schematic block diagram of a polling data collector in accordance with the invention.
Figure 15C:
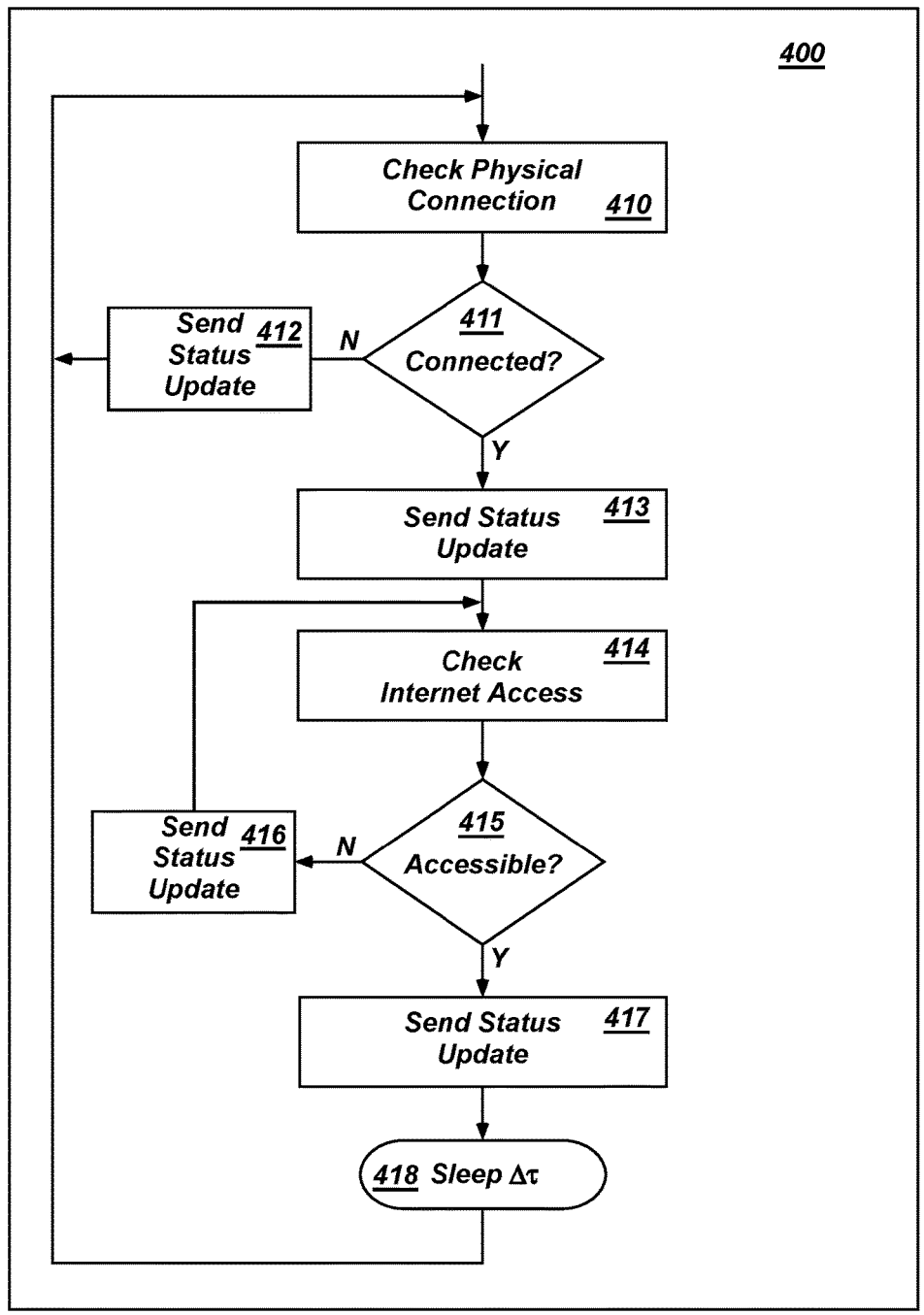
FIG. 15C is a schematic block diagram of a system and process for accessing the Internet, protected by an APA system in accordance with the invention.

Referring to FIG. 15, including FIGS. 15A through 15C, in a method and apparatus in accordance with the invention, a data agent 80 may be responsible for collecting and publishing data necessary to various components in the system. For example, in the illustrated embodiment, a polling data collector 396 may be responsible for periodically polling various components and software executing within the system 10, and particularly within the access point APA 12. Meanwhile, devices and processes that are interrupt driven may be followed, tracked, and otherwise recorded or have their activities recorded by an interrupt driven data collector 398. Meanwhile, the wide area network links may be monitored by a WAN link monitor 400.

In the illustrated embodiment, for example, the interrupt driven data collector 398 may operate to receive 397 data from any network connected to the data agent 80. Meanwhile, the data collector 398 publishes 399 that data. Publishing 399 may involve publishing to a publication/subscription system, or posting information to a bus, to a database record, or otherwise making available 399 the data received and collected. In one example, publishing 399 may involve sending 399 data collected by the data collector 398 to the publication/subscription system 46 described hereinabove.

Referring to FIG. 15B, a polling data collector 396 may initially read 401 various sensors existing within the system 10, or the access point assistant 12. Sensors may be of any type. Typically, sensors are mechanisms that detect a condition such as a change in temperature, passage of energy, fluid flow, light, the presence of darkness of night or light of day, and so forth. Similarly, sensors may involve the sensors 74 described hereinabove detecting the presence or proximity of a person in a dwelling, such as a hotel room. By whatever means or mode sensors will typically output a voltage, a current, or other sensible electronic signal.

Smart sensors may have computerized logic, microprocessors, and the like. Nevertheless, as a practical matter, most sensors need only be "dumb" devices that have no processing onboard, but simply a mechanism to detect a condition, and change a voltage or current in response thereto.

The polling data collector 396 may read 401 any sensors in a room. These may include anything involving the devices 17 within a room, any of the individual environmental controls, or the like.

Another responsibility of the polling data collector 396 is to read 402 the statistics from the operating system 58 of the access point assistant 12 or APA 12. Some of the statistics that may be collected, for example, are the number of data bytes, typically within a particular time period, and thereby the information necessary to calculate data transfer rates. This can be converted into bandwidth usage by the APA 12 or various devices 52 within the personal network 20 managed by the APA 12.

In addition, the polling data collector 396 may read 402 such information as condition status indications, such as whether or not certain processes or software packages are still running, if errors have been detected in those processes, the condition such as connection, disconnection, or data rates of peripherals communicating with a processor 214 anywhere in the system, or the like. Likewise, CPU usage is typically measured in a number of processes queued up waiting to be executed or run by a processor 214, or the like.

Since a processor 214 is typically run on a clock, the clock time is an ongoing parameter. However, number of processes begun, ended, waiting, or other throughput parameters may also be measured, monitored by the polling data collector 396, and read 402 as statistical information.

Any information that has been read 401, 402 may be sent 403 to a publication/subscription broker 46. Within the system 10 multiple executables and data records may be kept as publication/subscriptions services, simply as a mechanism to share information efficiently. However, one function of the publication/subscription broker 46 is to maintain information that needs to be kept and made readily accessible to the various components as well as the individual processes (e.g., software executables running on processors 212) needed to operate, inform, and otherwise support the APA 12 and the system 10.

As a practical matter, many components, such as the components 28 through 46 may actually be located at other physical locations "in the cloud." As a result, they may actually access the publication/subscription broker 46 also in the cloud. In other alternative embodiments, such a broker 46 may also be embodied within software, hardware, or other constituents within the APA system 12 itself or on a server 260 on the network 50.

Upon completion of sending 403 information to the publication/subscription broker 46, the polling data collector 396 may simply sleep 404 for some particular time. That sleep time or delay time between operations is principally a matter of computational efficiency. It is needless to run the data collection 396 at a rate that occupies processing bandwidth or communications bandwidth unnecessarily. Accordingly, sleep times may typically last from about five minutes to up to about twenty minutes. Typically, the sleep time is predetermined and occurs in response to the processing of the data collector 396. At the end of sleep time, the data collector 396 returns 405 back to reading 401, 402.

Referring to FIG. 15C, while continuing to refer generally to FIGS. 1 through 16, a WAN-link monitor 400 may initiate by checking 410 physical connections of various networks, such as the Ethernet 150, or the WiFi2 149. By "physical," is meant that it may be a wire connection or other physically sensible connection. It may also include a wireless connection in which the physical connection is a radio wave exchange. A test 411 may operate regularly to use the information derived from the check 410.

For example, if the physical connection is connected, an affirmative response results in sending 413 a status update to the publication/subscription mesh 64 illustrated in FIG. 10 above. This is one of those publication/subscription systems 64 described immediately hereinabove that may exist within the physical system 12 that constitutes the APA 12. If the test 411 results in a negative, or non-connected status, then a status update is sent 412 and the process 400 returns to the checking 410 on the physical connection.

The WAN link monitor 400 may regularly check 414 Internet access of the APA 12 to the Internet 18 through the LAN/WLAN 50 and the intermediate Internet service provider (ISP) 48. Again, in contradistinction to the physical connection being checked 410, a check 414 determines whether software is running, errors have been detected, systems have crashed, software has stopped running or the like, at other ISO/OSI layers.

For example, in checking 414 Internet access, the APA 12 may send a request to any device or a packet communication to any device anywhere across the Internet 18. If the Internet 18 does not respond or no response to the request is forthcoming, then the monitor 400 may logically assume and accordingly report 416 that Internet access does not appear to be available. If a packet is successful in going out through the Internet 18 from the APA 12 and the request contained therein receives a response, then logically, the check 414 can effectively determine that the test 415 has been satisfied. That is, the test 415 is whether Internet service is accessible. If it is, then a status update 417 may be sent to the publication/subscription mesh 64.

Likewise, if a request fails to receive a response then a negative return from the test 415 results in a status update being sent 416 to the publication/subscription mesh 64 and checking 414 continues. Following each of the checks 410, 413, with their consequent tests 411, 415 and ultimate sending 412, 416, 417 of status updates, the monitor 400 sleeps 418 for some period of time, typically predetermined and regularly set. Upon waking from the sleep 418 condition, the monitor 400 returns to checking 410 the physical connection and the remainder of the process 400 for which it is programmed.

Referring to FIG. 16, a process 420 to configure a custom private network is illustrated. For example, a guest may initially check in 422. Nevertheless, the step 422 also represents the operation by a computer, such as a computer 212 as part of a property management system 14, 36.

Accordingly, checking in 422 represents, in a broader sense, inputting, linking, or downloading all of the necessary information for an individual user or guest checking into a host location.

For example, in the case of an Internet café, a private Internet location, such as a restaurant or the like, or a hotel or other hospitality location, check in 422 represents the physical act of checking in. It is also the operation by the computer of receiving the inputs corresponding to a guest checking in.

The property management system 14, 36 will then pass 424 to the AMS 34 the information (data) corresponding to the check in step 422. The APA management system 34 may then look up 426 the key identifying information for the guest corresponding to the check in 422. A test 428 determines whether that guest identifying information represents a record present in the APA management system 34.

For example, a database may be maintained, or records 41, in general, corresponding to each repeated guest 289 may exist. In one presently contemplated embodiment, a loyalty database 38 maintained by the property 22 may be located in the cloud as illustrated in FIG. 1, at which location it may be accessed by any authorized computer 212. Thus, if the guest record 41 is present in the loyalty database 38, then an affirmative response to the test 428 advances the configuration process 420 to retrieving 430 that record 41 and the corresponding information represented therein.

Using that information, the APA management system 34 may then configure 432 WiFi1 147. This configuring 432 thereby configures the personal network 20 through the APA 12, in-room device 12, to communicate with the personal devices 52 of the guest 289.

Those network details were provided previously by the guest user 289. For example, in an earlier check in step 422, the guest 289 has the opportunity to provide configuration data to be stored in the loyalty database record 38. Thus, if the test 428 returns a negative response, then that configuration data is not present, and needs to be input. Accordingly, the process 420 advances to the input command 434. That is, inputting 434 a command to configure the custom private network (CCPN).

The jump from the test 428 to the input 434 step represents several actions. Principally, a guest 289 will go to a room, for example, and will then input 434 into the APA 12 a command requesting configuration of a custom private network 20. At this point, the APA 12 responds by asking for a network name. A user, in response, as the new guest 289 in the room, will input 438 the name of a network.

Similarly, the APA 12 will also ask 440 the user for a password. The user may then input 442 by any suitable means, a password. Any input 438, 442 process may be done by any suitable method. For example, a voice command through the listener 70 will be recognized by the APA 12, and acted upon. Similarly, the presence of buttons, a keyboard, tactile input mechanisms of various types, including a writing tablet 230, touchscreen 85*c*, and the like may all be available to a user 289 for selection and use. Nevertheless, a voice input is simple, and does not require interaction with keyboards 85*a*, buttons 85*b*, touchscreens 85*c*, or the like.

Having obtained the configuration information, the APA 12, now configures 444 the WiFi1 device 147. Having been so configured, the WiFi1 device 147 is now accessible by all the personal devices 52 of the user 289, forming a personal network 20 individually configured, and individually secured.

As a practical matter, storing 446 the configuration data provided may be done temporarily by the APA 12, but is better sent by the APA 12 back to the loyalty database 38 for use in the next check in 422 at another property. Thus, in the future, only the first portion of the CCPN process 420 need be used, and a guest will enter a new room with the APA 12 therein already set up or configured 432, 444 as desired and ready to work.

This system provides a functionality as described that has not be available in prior art systems. Such systems lack user interfaces enabling a user to personalize anything about the network. A conventional system may have an access point in a hall, or could provide one per individual room. However, such an access point has no user interface enabling required interactions. In a system 10 in accordance with the invention, a screen and a voice interface enable interactions between the user and the APA 12.

Consequently, conventional systems can only deliver essentially a configured wireless network throughout the entire site. They cannot provide individual, personalized, network services for individual guests. In contrast, a system 10 in accordance permits a site to control its network, and the individual guest to set up and control a personal network 20 therewithin.

The present invention may be embodied in other specific forms without departing from its purposes, functions, structures, or operational characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. An apparatus comprising:
    a property network, constituting at least one of a local area network and wide area network, installed on a property constituting real estate, the property network being operably connected to an Internetwork comprising the Internet;
    a property hub operating as a network controller of the property network to direct traffic between the property network and the Internet, the traffic constituting packets of data passing to and from nodes within the property network;
    a plurality of agents, each installed as a node of the nodes in the property network and constituting an access point comprising hardware acting as a transceiver and hot spot installed at a first physical location on the property and programmed to operate as a private network hub;
    a first plurality of devices, each associated with the first physical location and controlled by an owner corresponding to the first plurality of devices and associated with the first physical location;
    the first plurality of devices, each device thereof comprising a processor operably interconnected to a network card and being network aware to be operably connected to the Internet through a first access point of the access points, the first access point operating as a first network hub selected from the plurality of agents and installed at the first physical location;
    the private network hub, receiving a first bandwidth limit corresponding to the first location; and
    the private network hub being programmed to enforce communications through the private network hub at a rate not exceeding the first bandwidth limit.

2. The apparatus of claim 1, wherein the first plurality of devices comprises at least two of a laptop computer, a tablet computer, an audio playback system, a mobile telephone, an electronic reading display device, and a gaming device.

3. The apparatus of claim 2, wherein the first access point is operably connected to, and programmed to communicate with a room control installed at the first location.

4. The apparatus of claim 3, wherein the room control is operably connected to a room device selected from an entertainment device and an environment device.

5. The apparatus of claim 4, wherein the entertainment device is selected from a television, a radio, an audio playback system, a video playback system, a gaming system, and another broadcast receiver system.

6. The apparatus of claim 4, wherein the environment device is effective to control an aspect of an environment at the first location.

7. The apparatus of claim 6, wherein the environment device is selected from a thermostat controlling temperature, a humidity controller, an air circulation controller, a lighting controller, and an alarm controller associated with the first location.

8. The apparatus of claim 1, further comprising a voice control comprising a first speaker and a first microphone, both operably connected to an agent processor, and all constituting parts of the first agent to send, receive, and process, respectively, audible sounds at the first location.

9. The apparatus of claim 8, wherein the voice control further comprises a voice recognition unit programmed to convert speech to text, a natural language understanding unit programmed to convert text to actionable commands executable by a digital computing device, and a text-to-speech engine programmed to generate signals controlling the first speaker to produce audible speech directed into the first location.

10. The apparatus of claim 9, wherein the first agent is further programmed and operably connected to send and receive the actionable commands.

11. The apparatus of claim 10, wherein the first agent is further programmed to execute the actionable commands by submitting data to and receiving data from at least one of third party information services, a telephone exchange system, an agent management console, a property management system, a loyalty database associated with the property and including a record corresponding to the first private network, an agent-user preferences database corresponding to an owner of the private network devices, and a publication-subscription service.

12. The apparatus of claim 11, wherein the first agent is programmed to collect and report to the property network hub, data reflecting at least one of Internet use, bandwidth use, energy use, room control settings, private network configuration data, and other room status information.

13. The apparatus of claim 12, wherein the first agent is programmed to receive and transmit requests from the first location to the property hub for delivery to the property management system.

14. The apparatus of claim 13, wherein the requests are selected from housekeeping activities, reservation of facilities associated with the property, reservations for meals at facilities not associated with the property, bell desk corresponding to the property, concierge desk corresponding to the property, laundry, facility maintenance corresponding to the property, and emergency reporting services.

15. The apparatus of claim 1, wherein the first agent is programmed to download and process information controlling configuration of the first private network.

16. The apparatus of claim 1, wherein the first agent is programmed to download and process information controlling configuration of the devices in the first private network.

17. The apparatus of claim 16, wherein the first agent is programmed to automatically download customer preference data from a loyalty database and control environment devices at the first location based on the customer preference data.

18. The apparatus of claim 17, wherein the first access point comprises an input device and an output device operable by human intervention to provide commands effective to control the first agent.

19. The apparatus of claim 17,
wherein the first agent is operably connected to, and programmed to communicate with a room control installed at the first location to control at least one of an entertainment device and an environment device;
wherein the entertainment device is selected from a television, a radio, an audio playback system, a video playback system, a gaming system, and another broadcast receiver system; and
wherein the environment device is effective to control an aspect of an environment at the first location selected from a thermostat controlling temperature, a humidity controller, an air circulation controller, a lighting controller, and an alarm controller associated with the first location.

20. A method comprising:
providing a property network, constituting at least one of a local area network and wide area network, installed on a property constituting real estate, the property network being operably connected to an Internetwork comprising the Internet;
providing a property hub operating as a network controller of the property network to direct traffic between the property network and the Internet, the traffic constituting packets of data passing to and from nodes within the property network;
providing a plurality of agents, each installed as a node of the nodes in the property network and constituting an access point comprising hardware acting as a transceiver and hot spot installed at a first physical location on the property and programmed to operate as a private network hub;
connecting to a first agent of the plurality of agents, a first plurality of devices, each associated with the first physical location and controlled by an owner corresponding to the first plurality of devices and associated with the first physical location;
the connecting the first plurality of devices, wherein each device thereof comprises a processor operably interconnected to a network card and being network aware to be operably connected to the Internet through a first access point of the access points, the first access point operating as a first network hub selected from the plurality of agents and installed at the first physical location;
programming the AMS management system to provide to the nodes, including the private network hub, a first bandwidth limit corresponding to the first location; and
programming the private network hub to enforce communications through the private network hub at a rate not exceeding the first bandwidth limit.

* * * * *